(12) United States Patent
Kimmerling et al.

(10) Patent No.: US 11,162,886 B2
(45) Date of Patent: Nov. 2, 2021

(54) SYSTEMS, ARTICLES, AND METHODS FOR FLOWING PARTICLES

(71) Applicant: Massachusetts Institute of Technology, Cambridge, MA (US)

(72) Inventors: Robert J. Kimmerling, Cambridge, MA (US); Nicholas L. Calistri, Cambridge, MA (US); Scott R. Manalis, Cambridge, MA (US); Selim Olcum, Cambridge, MA (US); Mark M. Stevens, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 570 days.

(21) Appl. No.: 15/940,001

(22) Filed: Mar. 29, 2018

(65) Prior Publication Data
US 2018/0299362 A1    Oct. 18, 2018

Related U.S. Application Data

(60) Provisional application No. 62/480,148, filed on Mar. 31, 2017, provisional application No. 62/480,170, (Continued)

(51) Int. Cl.
*G01N 15/02* (2006.01)
*B01L 3/00* (2006.01)
(Continued)

(52) U.S. Cl.
CPC .... *G01N 15/0255* (2013.01); *B01L 3/502746* (2013.01); *B01L 3/502753* (2013.01);
(Continued)

(58) Field of Classification Search
CPC ........... G01N 15/0255; G01N 15/0205; G01N 15/0618; G01N 15/1056; G01N 15/1484;
(Continued)

(56) References Cited

U.S. PATENT DOCUMENTS

| | | |
|---|---|---|
| 7,215,214 B1 | 5/2007 | Taheri et al. |
| 7,387,889 B2 | 6/2008 | Manalis |

(Continued)

FOREIGN PATENT DOCUMENTS

| | | |
|---|---|---|
| CN | 103547889 A | 1/2014 |
| FR | 2996219 A1 | 4/2014 |

(Continued)

OTHER PUBLICATIONS

Dextras et al (Dextras et al. "Integrated Measurement of the Mass and Surface of Discreete Microparticles using a Suspended Microchannel Resonator"; Anal. Chem.; 2009, 81, pp. 4517-4523; hereinafter "Dextras").*

(Continued)

*Primary Examiner* — Benjamin R Whatley
(74) *Attorney, Agent, or Firm* — Wolf, Greenfield & Sacks, P.C.

(57) ABSTRACT

Systems and methods for flowing particles, such as biological entities, in a fluidic channel(s) are generally provided. In some cases, the systems described herein are designed such that a single particle may be isolated from a plurality of particles and flowed into a fluidic channel (e.g., a microfluidic channel) and/or collected e.g., on fluidically isolated surfaces. For example, the single particle may be present in a plurality of particles of relatively high density and the single particle is flowed into a fluidic channel, such that it is separated from the plurality of particles. The particles may be spaced within a fluidic channel so that individual particles may be measured/observed over time. In certain embodiments, the particle may be a biological entity. Such article and methods may be useful, for example, for isolating single cells into individual wells of multi-well cell culture dishes (e.g., for single-cell analysis).

18 Claims, 20 Drawing Sheets

Related U.S. Application Data filed on Mar. 31, 2017, provisional application No. 62/480,185, filed on Mar. 31, 2017.

(51) Int. Cl.
   G01N 15/14   (2006.01)
   G01N 15/06   (2006.01)
   G01N 15/10   (2006.01)

(52) U.S. Cl.
   CPC .... B01L 3/502761 (2013.01); G01N 15/0205 (2013.01); G01N 15/0618 (2013.01); G01N 15/1056 (2013.01); G01N 15/1484 (2013.01); *B01L 2300/0663* (2013.01); *B01L 2300/0864* (2013.01); *B01L 2400/0415* (2013.01); *B01L 2400/0487* (2013.01); *G01N 2015/0288* (2013.01); *G01N 2015/1006* (2013.01); *G01N 2015/1081* (2013.01); *G01N 2015/1087* (2013.01); *G01N 2015/149* (2013.01); *G01N 2015/1493* (2013.01)

(58) Field of Classification Search
   CPC ... G01N 2015/0288; G01N 2015/1006; G01N 2015/1081; G01N 2015/1087; G01N 2015/149; G01N 2015/1493; B01L 3/502746; B01L 3/502753; B01L 3/502761; B01L 2300/0663; B01L 2300/0864; B01L 2400/0415; B01L 2400/0487

See application file for complete search history.

(56) References Cited

U.S. PATENT DOCUMENTS

| | | | |
|---|---|---|---|
| 7,449,968 | B1 | 11/2008 | Cioffi et al. |
| 7,812,680 | B1 | 10/2010 | Brown et al. |
| 7,838,284 | B2 | 11/2010 | Manalis |
| 8,087,284 | B2 | 1/2012 | Babcock et al. |
| 8,291,750 | B1 | 10/2012 | Goodbread et al. |
| 8,722,419 | B2 | 5/2014 | Manalis et al. |
| 9,027,388 | B2 | 5/2015 | Babcock et al. |
| 9,134,294 | B2 | 9/2015 | Manalis et al. |
| 9,134,295 | B1 | 9/2015 | Delgado et al. |
| 9,347,815 | B2 | 5/2016 | Roukes et al. |
| 9,515,608 | B2 | 12/2016 | Gourlat et al. |
| 9,709,400 | B2 | 7/2017 | Kapusta |
| 9,757,727 | B2 | 9/2017 | Manalis et al. |
| 2003/0033876 | A1 | 2/2003 | Roukes et al. |
| 2003/0176174 | A1 | 9/2003 | Seppinen et al. |
| 2005/0064581 | A1 | 3/2005 | Manalis et al. |
| 2005/0164236 | A1 | 7/2005 | Su et al. |
| 2007/0176705 | A1 | 8/2007 | Sutardja |
| 2007/0178529 | A1 | 8/2007 | Breidford et al. |
| 2009/0014360 | A1 | 1/2009 | Toner et al. |
| 2009/0044608 | A1 | 2/2009 | Babcock et al. |
| 2009/0053749 | A1 | 2/2009 | Manalis et al. |
| 2009/0261241 | A1 | 10/2009 | Roukes et al. |
| 2010/0154535 | A1 | 6/2010 | Manalis et al. |
| 2010/0263445 | A1 | 10/2010 | Hayner et al. |
| 2010/0315138 | A1 | 12/2010 | Namba et al. |
| 2011/0113856 | A1 | 5/2011 | Cobianu et al. |
| 2011/0271412 | A1 | 11/2011 | Rychen |
| 2014/0013848 | A1 | 1/2014 | Colinet et al. |
| 2014/0156224 | A1 | 6/2014 | Roukes et al. |
| 2014/0306623 | A1 | 10/2014 | Caffee et al. |
| 2014/0312980 | A1 | 10/2014 | Villard et al. |
| 2015/0300999 | A1 | 10/2015 | Andreucci et al. |
| 2015/0308990 | A1 | 10/2015 | Andreucci et al. |
| 2015/0343444 | A1 | 12/2015 | Manalis et al. |
| 2016/0091544 | A1 | 3/2016 | Daneshmand et al. |
| 2016/0123858 | A1 | 5/2016 | Kapur et al. |
| 2016/0181977 | A1 | 6/2016 | Gourlat et al. |
| 2017/0117905 | A1 | 4/2017 | Cermak et al. |
| 2018/0207639 | A1* | 7/2018 | Butler ................ G01N 1/4077 |
| 2018/0245972 | A1 | 8/2018 | Cermak et al. |

FOREIGN PATENT DOCUMENTS

| | | |
|---|---|---|
| JP | 2007-506977 A | 3/2007 |
| JP | 2013-543127 A | 11/2013 |
| JP | 2014-006211 A | 1/2014 |
| JP | 2014-510921 A | 5/2014 |
| WO | WO 2012/059828 A2 | 5/2012 |
| WO | WO 2015/155044 A1 | 10/2015 |
| WO | WO 2016/069634 A1 | 5/2016 |
| WO | WO 2018/236708 A1 | 12/2018 |

OTHER PUBLICATIONS

Newsletter (MIT Faculty profile: Scott Manalis, by Jaime Goldstein; retrieved from wayback machine on Oct. 25, 2015; https://web.archive.org/web/2015*/https://be.mit.edu/news-events/newsletter/newsletter-spring-2014-faculty-profile-scott-manalis; hereinafter "Newsletter").*
International Search Report and Written Opinion dated Jun. 8, 2018 for Application No. PCT/US2018/025040.
Jin et al., A microfluidic device enabling high-efficiency single cell trapping. Biomicrofluidics. Jan. 7, 2015;9:014101(1-16).
Khalili et al., A microfluidic device for hydrodynamic trapping and manipulation platform of a single biological cell. Appl Sci. Feb. 1, 2016;6(40):1-17.
Narayanamurthy et al., Microfluidic hydrodynamic trapping for single cell analysis: mechanisms, methods and applications. Anal Methods. May 12, 2017;9:3751-72. doi: 10.1039/C7AY00656J. manuscript 29 pages.
International Search Report and Written Opinion dated Jan. 22, 2016 for Application No. PCT/US2015/057634.
International Preliminary Report on Patentability dated May 11, 2017 for Application No. PCT/US2015/057634.
International Search Report and Written Opinion dated Aug. 27, 2018 for Application No. PCT/US2018/037995.
Albrecht et al., Frequency modulation detection using high-Q cantilevers for enhanced force microscope sensitivity. J Appl Phys. Jan. 15, 1991;69(2):668-73.
Ananthakrishnan et al., Quantifying the contribution of actin networks to the elastic strength of fibroblasts. J Theor Biol. Sep. 21, 2006;242(2):502-16. Epub May 23, 2006.
Atia et al., A phase-locked shear-force microscope for distance regulation in near-field optical microscopy. Appl Phys Lett. Jan. 27, 1997;70(4):405-7.
Bagnall et al., Deformability-based cell selection with downstream immunofluorescence analysis. Integr Biol (Camb). May 16, 2016;8(5):654-64. doi: 10.1039/c5ib00284b. Epub Mar. 11, 2016.
Balland et al., Power laws in microrheology experiments on living cells: Comparative analysis and modeling. Phys Rev E Stat Nonlin Soft Matter Phys. Aug. 2006;74(2 Pt 1):021911(1-17). Epub Aug. 9, 2006.
Bouloc et al., All digital control system for a novel high frequency force sensor in non-contact atomic force microscopy, IEEE Sensors, Oct. 2012;2012:pp. 1-4. doi : 10.1109/ICSENS.2012.6411039.
Bouloc et al., FPGA-based programmable digital PLL with very high frequency resolution. 2011 18th IEEE Intl Conf on Electronics, Circuits, and Systems. Dec. 11-14, 2011;370-3.
Brangwynne et al., Force fluctuations and polymerization dynamics of intracellular microtubules. Proc Natl Acad Sci U S A. Oct. 9, 2007;104(41):16128-33. Epub Oct. 2, 2007.
Bremer et al., Modulation of chemical composition and other parameters of the cell at different exponential growth rates. EcoSal Plus. Sep. 2008;3(1):(1-49). doi: 10.1128/ecosal.5.2.3.
Bruus, Acoustofluidics 1: Governing equations in microfluidics. Lab Chip. Nov. 21, 2011;11(22):3742-51. doi: 10.1039/c11c20658c. Epub Oct. 20, 2011.
Bryan et al., Measurement of mass, density, and volume during the cell cycle of yeast. Proc Natl Acad Sci U S A. Jan. 19, 2010;107(3):999-1004. doi: 10.1073/pnas.0901851107. Epub Dec. 23, 2009.

(56) References Cited

OTHER PUBLICATIONS

Bryan et al., Measuring single cell mass, volume and density with dual suspended microchannel resonators. Lab Chip. 2014;14(3):569-76.

Burg et al., Nonmonotonic energy dissipation in microfluidic resonators. Phys Rev Lett. Jun. 5, 2009;102(22):228103(1-4). Epub Jun. 4, 2009.

Burg et al., Weighing of biomolecules, single cells and single nanoparticles in fluid. Nature. Apr. 26, 2007;446(7139):1066-9.

Butzin et al., Analysis of the effects of a gerP mutation on the germinationof spores of Bacillus subtilis. J Bacteriol. Nov. 2012;194(21):5749-58. doi: 10.1128/JB.01276-12. Epub Aug. 17, 2012.

Byun et al., Characterizing cellular biophysical responses to stress by relating density, deformability, and size. Biophys J. Oct. 20, 2015;109(8):1565-73. doi: 10.1016/j.bpj.2015.08.038.

Byun et al., Characterizing deformability and surface friction of cancer cells. Proc Natl Acad Sci U S A. May 7, 2013;110(19):7580-5. doi: 10.1073/pnas.1218806110. Epub Apr. 22, 2013.

Cartagena-Rivera et al., Actomyosin cortical mechanical properties in nonadherent cells determined by atomic force microscopy. Biophys J. Jun. 7, 2016;110(11):2528-2539. doi: 10.1016/j.bpj.2016.04.034.

Cermak et al., Direct single-cell biomass estimates for marine bacteria via Archimedes' principle. ISME J. Mar. 2017;11(3):825-828. doi: 10.1038/ismej.2016.161. Epub Dec. 6, 2016.

Cermak et al., High-throughput measurement of single-cell growth rates using serial microfluidic mass sensor arrays. Nat Biotechnol. Oct. 2016;34(10):1052-1059. doi: 10.1038/nbt.3666. Epub Sep. 5, 2016.

Cetin et al., Determining therapeutic susceptibility in multiple myeloma by single-cell mass accumulation. Nat Commun. Nov. 20, 2017;8(1):1613(1-12). doi: 10.1038/s41467-017-01593-2.

Chaste et al., A nanomechanical mass sensor with yoctogram resolution. Nat Nanotechnol. May 2012;7(5):301-4. doi: 10/1038/nnano.2012.42. Epub Apr. 1, 2012.

Chugh et al., Actin cortex architecture regulates cell surface tension. Nat Cell Biol. Jun. 2017;19(6):689-697. Suppl Info 19 pages. doi: 10.1038/ncb3525. Epub May 22, 2017.

Clark et al., Monitoring actin cortex thickness in live cells. Biophys J. Aug. 6, 2013;105(3):570-80. doi: 10.1016/j.bpj.2013.05.057.

Delgado et al., Intracellular water exchange for measuring the dry mass, water mass and changes in chemical composition of living cells. PLoS One. Jul. 2013;8(7):e67590(1-11).

Dendukuri et al., Continuous-flow lithography for high-throughput microparticle synthesis. Nat Mater. May 2006;5(5):365-9. Epub Apr. 9, 2006.

Dendukuri et al., Stop-flow lithography in a microfluidic device. Lab Chip. Jul. 2007;7(7):818-28. Epub May 21, 2007.

Di Carlo et al, Continuous inertial focusing, ordering, and separation of particles in microchannels. Proc Natl Acad Sci. Nov. 27, 2007;104(48):18892-7.

Dohn et al., Mass and position determination of attached particles on cantilever based mass sensors. Rev Sci Instrum. Oct. 2007;78(10):103303(1-3). Epub Oct. 31, 2010.

Dohn et al., Position and mass determination of multiple particles using cantilever based mass sensors. Appl Phys Lett. 2010;97(4):044103(1-3). Epub Jul. 29, 2010.

Ekinci et al., Ultimate limits to inertial mass sensing based upon nanoelectromechanical systems. J Appl Phys. Mar. 1, 2004;95(5):2682-9.

Fischer-Friedrich et al., Rheology of the active cell cortex in mitosis. Biophys J. Aug. 9, 2016;111(3):589-600. doi: 10.1016/j.bpj.2016.06.008.

Gardel et al., Mechanical integration of actin and adhesion dynamics in cell migration. Annu Rev Cell Dev Biol. 2010;26:315-33. doi: 10.1146/annurev.cellbio.011209.122036. Epub May 17, 2010.

Gavartin et al., Stabilization of a linear nanomechanical oscillator to its thermodynamic limit. Nat Commun. 2013;4:2860(1-8). doi: 10.1038/ncomms3860. Epub Dec. 11, 2013.

Georgatos et al., Nuclear envelope breakdown in mammalian cells involves stepwise lamina disassembly and microtubule-drive deformation of the nuclear membrane. J Cell Sci. Sep. 1997;110( Pt 17):2129-40.

Gerhardt et al., Permeability of bacterial spores. II. Molecular variables affecting solute permeation. J Bacteriol. Nov. 1961;82:750-60.

Godin et al., Using buoyant mass to measure the growth of single cells. Nat Methods. May 2010;7(5):387-90. Suppl Info 2 pages. doi: 10.1038/nmeth.1452. Epub Apr. 11, 2010.

Gossett et al., Hydrodynamic stretching of single cells for large population mechanical phenotyping. Proc Natl Acad Sci U S A. May 15, 2012;109(20):7630-5. doi: 10.1073/pnas.1200107109. Epub Apr. 30, 2012.

Grover et al., Measuring single-cell density. Proc Natl Acad Sci U S A. Jul. 5, 2011;108(27):10992-6. doi: 10.1073/pnas.1104651108. Epub Jun. 20, 2011. Early Edition, 5 pages.

Guillou et al., Dynamic monitoring of cell mechanical properties using profile microindentation. Sci Rep. Feb. 9, 2016;6:21529(1-13). doi: 10.1038/srep21529.

Guo et al., Cell volume change through water efflux impacts cell stiffness and stem cell fate. Proc Natl Acad Sci U S A. Oct. 10, 2017;114(41):E8618-E8627. doi: 10.1073/pnas.1705179114. Epub Sep. 25, 2017. Early Edition, 10 pages.

Gupta et al., Equilibrium and out-of-equilibrium mechanics of living mammalian cytoplasm. J Mechan Phys Solids. 2017;107:284-93. Epub Jul. 8, 2017.

Hanay et al., Single-protein nanomechanical mass spectrometry in real time. Nat Nanotechnol. Sep. 2012;7(9):602-8. doi: 10.1038/nnano.2012.119. Epub Aug. 26, 2012.

Hartono et al., On-chip measurements of cell compressibility via acoustic radiation. Lab Chip. Dec. 7, 2011;11(23):4072-80. Epub Oct. 21, 2011.

Henderson et al., Actin filament dynamics in living glial cells imaged by atomic force microscopy. Science. Sep. 25, 1992;257(5078):1944-6.

Hiramoto et al., Mechanical properties of the surface of the sea urchin egg at fertilization and during cleavage. Exp Cell Res. Dec. 1974;89(2):320-6.

Hogenauer, An economical class of digital filters for decimation and interpolation. IEEE Trans on Acoustics, Speech, and Signal Processing. Apr. 1981;29(2):155-62.

Ivanova et al., Bactericidal activity of black silicon. Nat Commun. 2013;4:2838(1-7). doi: 10.1038/ncomms3838. Epub Nov. 26, 2013.

Kimmerling et al., A microfluidic platform enabling single-cell RNA-seq of multigenerational lineages. Nat Commun. Jan. 6, 2016;7:10220(1-7). doi: 10.1038/ncomms10220. Epub Jan. 6, 2016.

Kimmerling, A toolset for linking phenotype and gene expression at the single-cell level. Doctoral Thesis—Massachusetts Institute of Technology. Feb. 2017. 142 pages.

Knudsen et al., Water and small-molecule permeation of dormant Bacillus subtilis spores. J Bacteriol. Jan. 2016;198(1):168-77. doi: 10.1128/JB.00435-15. Epub Oct. 19, 2015.

Kobayashi et al., Frequency noise in frequency modulation atomic force microscopy. Rev Sci Instrum. Apr. 2009;80(4):043708(1-8). doi: 10.1063/1.3120913. Epub Apr. 27, 2009.

Kouh et al., Room-temperature operation of a nanoelectromechanical resonator embedded in a phase-locked loop. Appl Phys Lett. 2005;87(11):113112(1-3). Epub Sep. 9, 2005.

Kundu et al., Measuring elastic properties of cells by evaluation of scanning acoustic microscopy V(Z) values using simplex algorithm. Biophys J. May 1991;59(6):1194-207.

Lee et al., High precision particle mass sensing using microchannel resonators in the second vibration mode. Rev Sci Instruments. Feb. 17, 2011;82(2):023704(1-4).

Lee et al., Suspended microchannel resonators with piezoresistive sensors. Lab Chip. Feb. 21, 2011;11(4):645-51. doi: 10.1039/c01c00447b. Epub Dec. 22, 2010.

Lee et al., Toward attogram mass measurements in solution with suspended nanochannel resonators. Nano Lett. Jul. 14, 2010;10(7):2537-42. doi: 10.1021/nl101107u. Epub Jun. 8, 2010.

Lim et al., Mechanical models for living cells—a review. J Biomech. 2006;39(2):195-216.

(56) References Cited

OTHER PUBLICATIONS

Lincoln et al., High-throughput rheological measurements with an optical stretcher. Methods Cell Biol. 2007;83:397-423.

Matzke et al., Direct, high-resolution measurement of furrow stiffening during division of adherent cells. Nat Cell Biol. Jun. 2001;3(6):607-10.

Olcum et al., High-speed multiple-mode mass-sensing resolves dynamic nanoscale mass distributions. Nat Commun. 2015;6:7070(1-8). doi: 10/1038/ncomms8070. Epub May 12, 2015.

Olcum et al., Weighing nanoparticles in solution at the attogram scale. Proc Natl Acad Sci U S A. Jan. 28, 2014;111(4):1310-5. doi: 10.1073/pnas.1318602111. Epub Jan. 13, 2014.

Otto et al., Real-time deformability cytometry: on-the-fly cell mechanical phenotyping. Nat Methods. Mar. 2015;12(3):199-202, 4 p following 202. doi: 10.1038/nmeth.3281. Epub Feb. 2, 2015.

Ou-Yang et al, Complex fluids: Probing mechanical properties of biological systems with optical tweezers. Annu Rev Phys Chem. 2010;61:421-40. doi: 10.1146/annurev.physchem.012809.103454. Epub Jan. 4, 2010.

Paluch et al., Biology and physics of cell shape changes in development. Curr Biol. Sep. 15, 2009;19(17):R790-9. doi: 10.1016/j.cub.2009.07.029.

Plomp et al., Architecture and assembly of the Bacillus subtilis spore coat. PLoS One. Sep. 26, 2014;9(9):e108560(1-16). doi: 10.1371/journal.pone.0108560. eCollection 2014.

Pritchard et al., The role of F-actin in hypo-osmotically induced cell volume change and calcium signaling in anulus fibrosus cells. Ann Biomed Eng. Jan. 2004;32(1):103-11.

Radmacher, Studying the mechanics of cellular processes by atomic force microscopy. Methods Cell Biol. 2007;83:347-72.

Ramanathan et al., Cdk1-dependent mitotic enrichment of cortical myosin II promotes cell rounding against confinement. Nat Cell Biol. Feb. 2015;17(2):148-59. Suppl Info 10 pages. doi: 10.1038/ncb3098. Epub Jan. 26, 2015.

Riedl, et al., Lifeact: a versatile marker to visualize F-actin. Nat Methods. Jul. 2008;5(7):605-7. doi: 10.1038/nmeth.1220. Epub Jun. 8, 2008.

Rinke et al., Obtaining genomes from uncultivated environmental microorganisms using FACS-based single-cell genomics. Nat Protoc. May 2014;9(5):1038-48. doi: 10.1038/nprot.2014.067. Epub Apr. 10, 2014.

Rodrigues et al., Kinetochore-localized PP1-Sds22 couples chromosome segregation to polar relaxation. Nature. Aug. 27, 2015;524(7566):489-92. Suppl Info 18 pages. doi: 10.1038/nature14496. Epub Jul. 13, 2015.

Sader et al., Energy dissipation in microfluidic beam resonators: Effect of Poisson's ratio. Phys Rev E Stat Nonlin Soft Matter Phys. Aug. 2011;84(2 Pt 2):026304(1-15). Epub Aug. 5, 2011.

Sader et al., Energy dissipation in microfluidic beam resonators: Dependence on mode number. J Appl Phys. Dec. 1, 2010;108(11):114507(1-14). Epub Dec. 9, 2010.

Scherrer et al., Density, porosity, and structure of dried cell walls isolated from Bacillus megaterium and *Saccharomyces cerevisiae*. J Bacteriol. Feb. 1977;129(2):1162-4.

Scherrer et al., Porosity of the yeast cell wall and membrane. J Bacteriol. May 1974;118(2):534-40.

Scherrer et al., Macromolecular sieving by the dormant spore of Bacillus cereus. J Bacteriol. Nov. 1971;108(2):868-73.

Sell et al., A digital PLL circuit for resonator sensors. Sensors and Actuators A. Feb. 26, 2011;172(1):69-74.

Son et al., Direct observation of mammalian cell growth and size regulation. Nat Methods. Sep. 2012;9(9):910-2. doi: Suppl Info 1 page. 10.1038/nmeth.2133. Epub Aug. 5, 2012.

Son et al., Resonant microchannel volume and mass measurements show that suspended cells swell during mitosis. J Cell Biol. Nov. 23, 2015;211(4):757-63. doi: 10.1083/jcb.201505058.

Steltenkamp et al., Membrane stiffness of animal cells challenged by osmotic stress. Small. Aug. 2006;2(8-9):1016-20.

Stevens et al., Drug sensitivity of single cancer cells is predicted by changes in mass accumulation rate. Nat Biotechnol. Nov. 2016;34(11):1161-1167. Suppl Info 2 pages. doi: 10.1038/nbt.3697. Epub Oct. 10, 2016.

Stewart et al., Hydrostatic pressure and the actomyosin cortex drive mitotic cell rounding. Nature. Jan. 13, 2011;469(7329):226-30. Suppl Info 1 page. doi: 10.1038/nature09642. Epub Jan. 2, 2011.

Swaminathan et al., Mechanical stiffness grades metastatic potential in patient tumor cells and in cancer cell lines. Cancer Res. Aug. 1, 2011;71(15):5075-80. Author Manuscript 18 pages. doi: 10.1158/0008-5472.CAN-11-0247. Epub Jun. 3, 2011.

Tseng et al., Micromechanical mapping of live cells by multiple-particle-tracking microrheology. Biophys J. Dec. 2002;83(6):3162-76.

Wang et al., Acoustophoretic force-based compressibility measurement of cancer cells having different metastatic potential. Proc Mtgs Acoust. Jun. 2013;19:045019(1-5).

Wang et al., Fast stiffness mapping of cells using high-bandwidth atomic force microscopy. ACS Nano. Jan. 26, 2016;10(1):257-64. doi: 10.1021/acsnano.5b03959. Epub Nov. 11, 2015.

Wang et al., Mechanotransduction across the cell surface and through the cytoskeleton. Science. May 21, 1993;260(5111):1124-7.

Yang et al., A comprehensive strategy for the analysis of acoustic compressibility and optical deformability on single cells. Sci Rep. Apr. 4, 2016;6:23946(1-11). doi: 10.1038/srep23946.

Yeung et al., Cortical shell-liquid core model for passive flow of liquid-like spherical cells into micropipets. Biophys J. Jul. 1989;56(1):139-49.

Zlotek-Zlotkiewicz et al., Optical volume and mass measurements show that mammalian cells swell during mitosis. J Cell Biol. Nov. 23, 2015;211(4):765-74. doi: 10.1083/jcb.201505056.

International Preliminary Report on Patentability dated Jan. 2, 2020 for Application No. PCT/US2018/037995.

International Preliminary Report on Patentability dated Oct. 10, 2019 for Application No. PCT/US2018/025040.

\* cited by examiner

200

142
210

144
212

SYSTEMS, ARTICLES, AND METHODS FOR FLOWING PARTICLES

RELATED APPLICATIONS

This application claims priority under 35 U.S.C. § 119(e) to U.S. Provisional Patent Application Ser. No. 62/480,148, filed Mar. 31, 2017, and entitled "Systems and Methods for Flowing Particles," to U.S. Provisional Patent Application Ser. No. 62/480,170, filed Mar. 31, 2017, and entitled "Methods and Articles for Isolating Single Particles," and to U.S. Provisional Patent Application Ser. No. 62/480,185 entitled "Devices and Methods for Directing Flow of Particles," each of which is incorporated herein by reference in its entirety for all purposes.

GOVERNMENT SUPPORT

This invention was made with government support under Grant No. R01 CA170592 awarded by the National Institute of Health. The government has certain rights in the invention.

TECHNICAL FIELD

The present invention generally relates to methods, systems, articles, and devices for flowing particles, such as biological entities, in a fluidic channel. In some cases, the invention relates to directing flow of particles in a fluidic channel and/or isolating particles on fluidically isolated surfaces.

SUMMARY

The present invention generally relates to methods, systems, articles, and devices methods for flowing particles, such as biological entities, in a fluidic channel, directing flow of particles in a fluidic channel, and isolating particles on fluidically isolated surfaces. In one aspect, methods are provided. In some embodiments, the method comprises flowing a plurality of particles in a first fluidic channel such that a single particle enters a second fluidic channel, wherein the second fluidic channel intersects and is in fluidic communication with the first fluidic channel, detecting, with a detector, the presence of the single particle in the second fluidic channel, and upon detecting the presence of the single particle in the second fluidic channel, flowing at least a portion of the remaining plurality of particles through the first fluidic channel, while maintaining the single particle in the second fluidic channel and introducing no additional particles into the second fluidic channel.

In some embodiments, the method comprises introducing a single particle into a second fluidic channel from a first fluidic channel containing a plurality of particles, the second fluidic channel in fluidic communication with the first fluidic channel, detecting the single particles in the second fluidic channel, and responsive to detecting the single particle, retaining the single particle essentially at a constant flow rate in the second fluidic channel while flowing additional particles through the first fluidic channel.

In some embodiments, the method comprises introducing a plurality of particles into a first fluidic channel, flowing the plurality of particles in the first fluidic channel such that at least a portion of the particles enter a second fluidic channel, wherein the second fluidic channel intersects and is in fluidic communication with the first fluidic channel, wherein each particle enters the second fluidic channel from the first fluidic channel at a frequency within a range of from less than or equal to 1 particle per 10 seconds to greater than or equal to 1 particle per 120 seconds, and flowing, between the entry of each particle into the second fluidic channel from the first fluidic channel, a fluid in the first fluidic channel.

In some embodiments, the method comprises introducing a fluid comprising plurality of particles to a first fluidic channel and flowing the fluid in the first fluidic channel such that at least a portion of the particles enter a second fluidic channel, wherein the second fluidic channel intersects and is in fluidic communication with the first fluidic channel, wherein each particle enters the second fluidic channel from the first fluidic channel at a frequency of less than or equal to 1 particle per 10 particles are present in the fluid at a density of at least 100 particles per mL.

In some embodiments, the method comprises introducing, from a first fluidic channel containing a disordered arrangement of particles, into a second fluidic channel, a series of individual particles positioned in the second fluidic channel, separated from each other by a spacing with an average distance of from 20 microns to 500 mm, wherein 90% of the spacings differ by no more than 10% from the average distance, at a rate of at least 1 particles per 10 seconds.

In some embodiments, the method comprises flowing, through a fluidic channel associated with a plurality of fluidically isolated surfaces, a plurality of particles and collecting the plurality of particles, such that each particle is associated with a single fluidically isolated surface.

In some embodiments, the method comprises flowing, through a fluidic channel, a plurality of particles such that each particle is spaced at least 1 mm apart along the longitudinal axis of the fluidic channel and collecting each particle on a fluidically isolated surface.

In another aspect, methods for collecting particles are provided. In some embodiments, the method comprises flowing, through a second fluidic channel, a plurality of particles and flowing, through a first fluidic channel in fluidic communication with the second fluidic channel, at least a portion of the plurality of particles, wherein the second fluidic channel comprises an exit positioned in the first fluidic channel and wherein a frequency of particles exiting the second fluidic channel into the first fluidic channel is less than or equal to 1 particle per 10 seconds and greater than or equal to 1 particle per 120 seconds.

In another aspect, systems are provided. In some embodiments, the system comprises a first fluidic channel, a second fluidic channel intersecting and in fluidic communication with the first fluidic channel, at least one pressure source associated with the first fluidic channel, and a detector associated with the second fluidic channel, wherein the system is configured such that, upon detection by the detector of the presence of a single particle in the second fluidic channel, at least one property of one or more of the at least one pressure source is changed.

In another aspect, articles are provided. In some embodiments, the article comprises a plurality of fluidically isolated surfaces and a single particle associated with each fluidically isolated surface.

In one aspect, fluidic devices are provided. In some embodiments, the fluidic device comprises a suspended microchannel resonator, a second fluidic channel in fluidic communication with the suspended microchannel resonator, and a first fluidic channel in fluidic communication with the second fluidic channel, wherein a longitudinal axis of the second fluidic channel is orthogonal to a longitudinal axis of the first fluidic channel and the second fluidic channel comprises an exit positioned at or near the center of the first fluidic channel.

In certain embodiments, the plurality of particles are a plurality of biological entities. In certain embodiments, the plurality of biological entities comprise virions, bacteria, protein complexes, exosomes, cells, or fungi.

Other advantages and novel features of the present invention will become apparent from the following detailed description of various non-limiting embodiments of the invention when considered in conjunction with the accompanying figures. In cases where the present specification and a document Incorporated by reference include conflicting and/or inconsistent disclosure, the present specification shall control.

BACKGROUND

Single-cell analysis is a powerful approach in advancing understanding of health and disease. For example, in cancer biology, tumors consist of genetically heterogeneous cell populations that are difficult to address with traditional bulk tumor measurements. Recent technological progresses reveal growing applications of single-cell analysis in cancer translational medicine such as early detection, diagnosis, treatment monitoring and selection. However, there remain significant challenges with single-cell isolation with respect to yield, quality, throughput, and cost.

Accordingly, improved devices and methods are needed.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
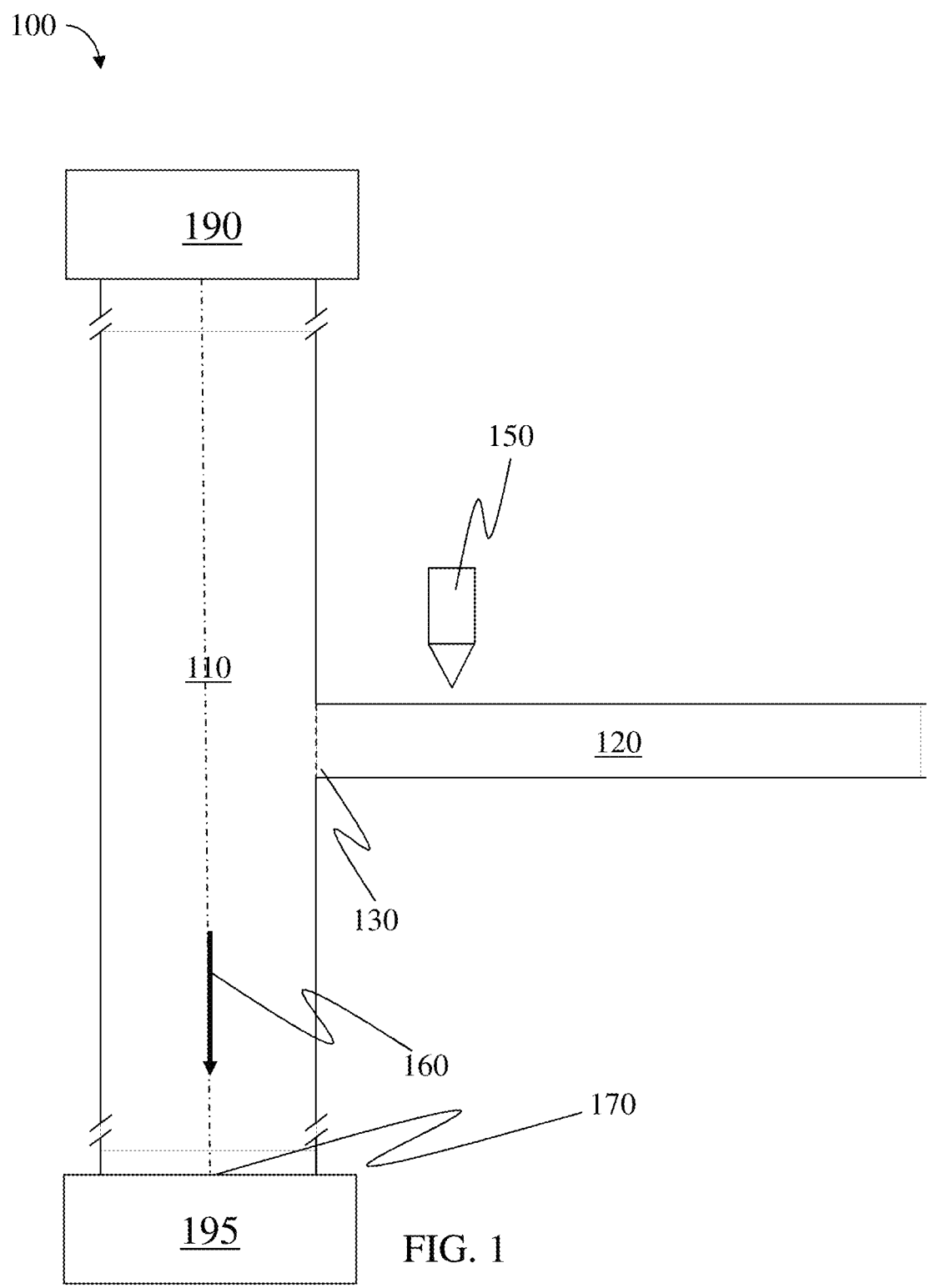
FIG. 1 is a schematic illustration of a system for flowing a particle, according to one set of embodiments.

Systems and methods for flowing particles, such as biological entities, in a fluidic channel(s) are generally provided. In some cases, the systems described herein are designed such that a single particle may be isolated from a plurality of particles and flowed into a fluidic channel (e.g., a microfluidic channel). For example, the single particle may be present in a plurality of particles of relatively high density and the single particle is flowed into a fluidic channel, such that it is separated from the plurality of particles. In some cases, more than one particle may be flowed into a fluidic channel such that each particle enters the fluidic channel at a relatively low frequency (e.g., of less than 1 particle per 10 seconds). The particles may be spaced within a fluidic channel so that individual particles may be measured/observed over time. In certain embodiments, the particle may be a biological entity.

In some embodiments, devices and methods for directing the flow of particles, such as biological entities, in a fluidic channel(s) are provided. In some cases, the devices described herein are designed such that a single particle may be collected from a plurality of particles and flowed into a fluidic channel (e.g., a microfluidic channel). For example, the single particle may be present in a fluidic channel comprising a plurality of particles and the single particle is flowed into an orthogonal fluidic channel, such that the single particle is collected (e., via an outlet of the orthogonal fluidic channel). In some cases, more than one particle may be flowed into a second fluidic channel from a first fluidic channel such that each particle enters the second fluidic channel at a relatively low frequency (e.g., of less than 1 particle per 10 seconds). One or more physical properties of the particles may be measured/observed over time before collecting the particle(s). In certain embodiments, the particle may be a biological entity.

Certain embodiments are related to methods and articles for isolating particles such as biological entities on, for example, fluidically isolated surfaces. In some cases, the methods and articles are designed such that a single particle isolated from a plurality of particles may be associated with a single fluidically isolated surface amongst a plurality of fluidically isolated surfaces. Such article and methods may be useful, for example, for isolating single cells into individual wells of multi-well cell culture dishes (e.g., for single-cell analysis). In certain embodiments, a plurality of particle are flowed along a channel at a particular spacing, such that a single particle may be introduced onto a fluidically isolated surface.

The term 'fluidically isolated surface' as used herein refers a surface which is not in liquid communication with another surface. A surface that is fluidically isolated with respect to another surface refers to a surface of the same type (e.g., the bottom surface of a well, the bottom surface of a dish, the sidewall of a conical tube). As used herein, a "fluid" is given its ordinary meaning, i.e., a liquid or a gas. A fluid cannot maintain a defined shape and will flow during an observable time frame to fill the container in which it is put. Thus, the fluid may have any suitable viscosity that permits flow. However, one of ordinary skill in the art would understand, based upon the teachings of this specification, that when two or more surfaces are said to be 'fluidically isolated', that this refers to two or more surfaces (of the same type) that are specifically not in liquid communication. Those of ordinary skill in the art would also understand that a liquid need not be present for the two or more surfaces to be 'fluidically isolated'. For example, in some embodiments, the introduction of a liquid to one of the two or more fluidically isolated surfaces, would not result in the liquid being introduced to any of the remaining surfaces. The two or more surfaces may, in some cases, be 'fluidically isolated' and in gaseous communication (e.g., two or more surfaces exposed to the same surrounding environment). In some embodiments, the two or more surfaces may be physically connected (e.g., two or more wells of a multi-well cell culture plate), however, each surface is fluidically isolated from one another. In some embodiments, the two or more surfaces may not be physically connected (e.g., surfaces present on two or more conical tubes, two or more channels, two or more dishes (e.g., petri dishes)). In certain embodiments, single particles from a plurality of particles may each be associated with each fluidically isolated surface amongst a plurality of fluidically isolated surfaces.

In an exemplary embodiment, a first fluidically isolated surface comprises the bottom surface of a first well (e.g., of a multi-well cell culture plate) and a second fluidically isolated surface comprises the bottom surface of a second well. One of ordinary skill in the art would understand that while each well may comprise, for example, a sidewall (i.e. a surface in physical and fluidic communication with the bottom surface of the well), that fluidically isolated surfaces refers to fluidically isolated surfaces of the same type (e.g., the bottom surface of each well).

In another exemplary embodiment, a first fluidically isolated surface comprises a first hydrophilic region of a substrate and a second fluidically isolated surface comprises a second hydrophilic region of the substrate, such that the first hydrophilic region and the second hydrophilic region are not in liquid communication.

Advantageously, the systems, devices, and methods described herein may permit the measurement and/or observation of a single particle (e.g., a biological entity such as a cell or bacteria) over relatively long periods of time (e.g., greater than 10 minutes). For example, the growth of a cell may be monitored using an array of suspended microchannel resonators and the use of the systems and methods described herein permit the measurement of a single cell in a single suspended microchannel resonator at a particular moment in time. In some embodiments, the spacing (or frequency) of particles within the fluidic channel may be controlled. Advantageously, the particles may be separated from a relatively concentrated source of particles without subsequent and/or significant dilution of the source and/or without the application of relatively high shear forces being applied to the particles. For example, a relatively high density plurality of particles (e.g., biological entities) may be introduced to a fluidic channel and a single particle from the plurality of particles may be flowed into an intersecting fluidic channel and separated from the plurality of particles without diluting the plurality of particles. In some such cases, multiple particles may be flowed into the intersecting fluidic channel from the plurality of particles such that each particle in the intersecting fluidic channel are spaced apart with a relatively uniform and large average spacing (e.g., at least 1 mm apart) and/or enter the fluidic channel at a relatively low average frequency (e.g., less than or equal to 1 particle per 10 seconds). Such systems and methods may be particularly useful for measuring the physical properties (e.g., mass, size, density, or change of mass, size, and/or density over time) of individual cells (e.g., bacteria, yeast, liquid tumor cells, solid tumor cells suspended in fluid, immune cells). Such systems and methods may also be useful for measuring physical properties of populations of cells that are physically attached to each other such as neuro-spheres of glioblastoma multiforme or masses of tumor cells that are isolated from a tissue biopsy or cell culture.

Advantageously, the devices and methods described herein may permit the collection of individual particles (e.g., biological entities) at a desired frequency (e.g., such that the individual particles may be collected and/or sorted). In some embodiments, a plurality of particles may be collected such that two or more particles do not aggregate during collection (e.g., a single particle exits an outlet of the device at a particular frequency). In some cases, the growth of a cell may be monitored using an array of suspended microchannel resonators and the use of the devices and methods described herein permit the collection of a single cell after determination of one or more physical properties of the cell.

In some embodiments, the particle is a biological entity. Non-limiting examples of biological entities include virions, bacteria, protein complexes, exosomes, cells, or fungi (e.g., yeast). In some embodiments, the biological entity is obtained from a subject. A "subject" refers to any animal such as a mammal (e.g., a human). Non-limiting examples of subjects include a human, a non-human primate, a cow, a horse, a pig, a sheep, a goat, a dog, a cat or a rodent such as a mouse, a rat, a hamster, a bird, a fish, or a guinea pig. In an exemplary embodiment, the biological entity is a human cell. In some embodiments, the systems and methods described herein are useful for separating biological entities into a fluidic channel from a plurality of biological entities obtained from a subject for example, determining one or more physical properties of the biological entity (e.g., growth behavior), sorting, and/or diagnostic purposes.

In some embodiments, the plurality of particles (e.g., a plurality of biological entities) are provided (e.g., suspended) in a fluid. In some embodiments, the plurality of particles are in disordered arrangement in the fluid. As used herein, a "fluid" is given its ordinary meaning, i.e., a liquid or a gas. A fluid cannot maintain a defined shape and will flow during an observable time frame to fill the container in which it is put. Thus, the fluid may have any suitable viscosity that permits flow. In a particular set of embodiments, the fluid is a liquid. In some embodiments, the fluid comprises water, a reagent, a solvent, a buffer, a cell-growth medium, or combinations thereof. In certain embodiments, the particles are relatively soluble in the fluid. In some embodiments, the fluid does not comprise a colloid (e.g., such as an emulsion). For example, in some embodiments, the particle (e.g., biological entity) is not disposed (and/or encapsulated) by a first fluid that is immiscible with, and surrounded by, a second fluid different than the first fluid. However, one of ordinary skill in the art, based upon the teachings of this specification, would understand that the systems and methods described herein may be used for separating a single colloid into a channel from a plurality of colloids. One of ordinary skill in the art, based upon the teachings of this specification, would also understand that the devices and methods described herein may be used for collecting a single colloid in a channel from a plurality of colloids.

As illustrated in FIG. 1, in some embodiments, system 100 comprises first fluidic channel 110 (e.g., a primary fluidic channel) and second fluidic channel 120 (e.g., an intersection fluidic channel) intersecting first fluidic channel 110 at intersection 130. In some such embodiments, second fluidic channel 120 is downstream of, and terminates at, intersection 130. Those of ordinary skill in the art would understand that while FIG. 1 illustrates second fluidic channel 120 as orthogonal to first fluidic channel 110, such illustration is intended to be non-limiting and that any suitable non-zero angle between first fluidic channel 110 and second fluidic channel 120 may also be possible (e.g., an angle between first fluidic channel 110 and second fluidic channel 120 of greater than or equal to 15 degrees and less than or equal to 90 degrees, greater than or equal to 15 degrees and less than or equal to 45 degrees, greater than or equal to 30 degrees and less than or equal to 60 degrees, greater than or equal to 45 degrees and less than or equal to 75 degrees, greater than or equal to 60 degrees and less than or equal to 90 degrees, or greater than or equal to 75 degrees and less than or equal to 90 degrees).

Figure 2A:
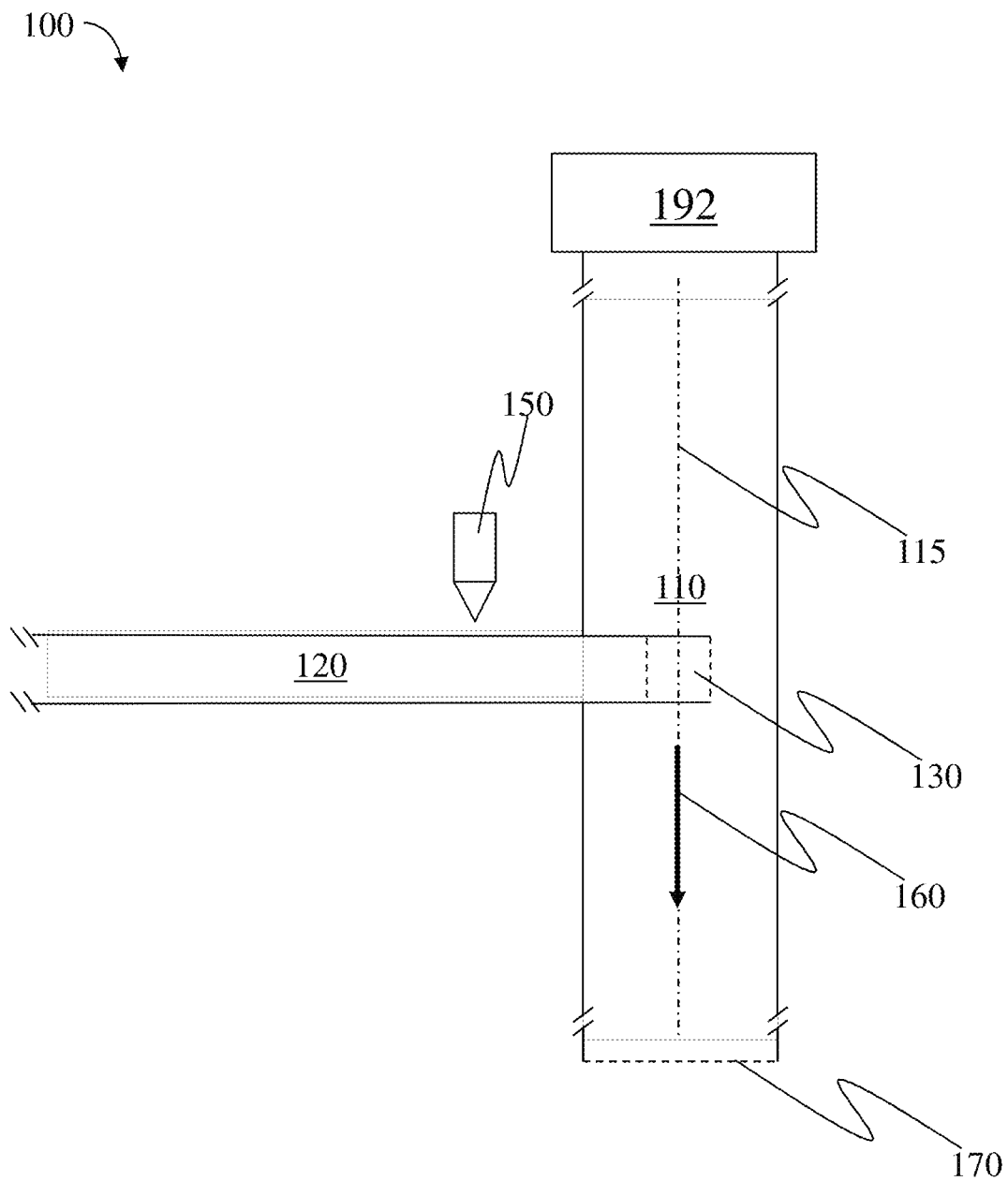
FIG. 2A is a cross-sectional top-down view schematic illustration of a device for directing the flow of a particle, according to one set of embodiments.

As illustrated in FIG. 2A, in some embodiments, device 100 comprises a first fluidic channel 110 (e.g., a collection channel) and a second fluidic channel 120 (e.g., an outlet channel) comprising an exit 130 (e.g., an outlet) positioned at or near the center (e.g., as indicated by centerline 115) of at least one cross-sectional dimension of first fluidic channel 110. In some embodiments, a longitudinal axis of second fluidic channel 120 is orthogonal to a longitudinal axis of first fluidic channel 110. In certain embodiments, an exit 130 of second fluidic channel 120 is disposed within first fluidic channel 110 (e.g., such that first fluidic channel 110 and second fluidic channel 120 are in fluidic communication). Those of ordinary skill in the art would understand that while FIG. 2A illustrates second fluidic channel 120 as orthogonal to first fluidic channel 110, such illustration is intended to be non-limiting and that any suitable non-zero angle between first fluidic channel 110 and second fluidic channel 120 may also be possible (e.g., an angle between first fluidic channel 110 and second fluidic channel 120 of greater than or equal to 15 degrees and less than or equal to 90 degrees, greater than or equal to 15 degrees and less than or equal to 45 degrees, greater than or equal to 30 degrees and less than or equal to 60 degrees, greater than or equal to 45 degrees and less than or equal to 75 degrees, greater than or equal to 60 degrees and less than or equal to 90 degrees, or greater than or equal to 75 degrees and less than or equal to 90 degrees).

In some embodiments, at least a portion of second fluidic channel may have a longitudinal axis that is substantially parallel to a longitudinal axis of the first fluidic channel. In some cases, the portion of the second fluidic channel that has a longitudinal axis that is substantially parallel to a longitudinal axis of the first fluidic channel may be disposed within the first fluidic channel.

Figure 2B:
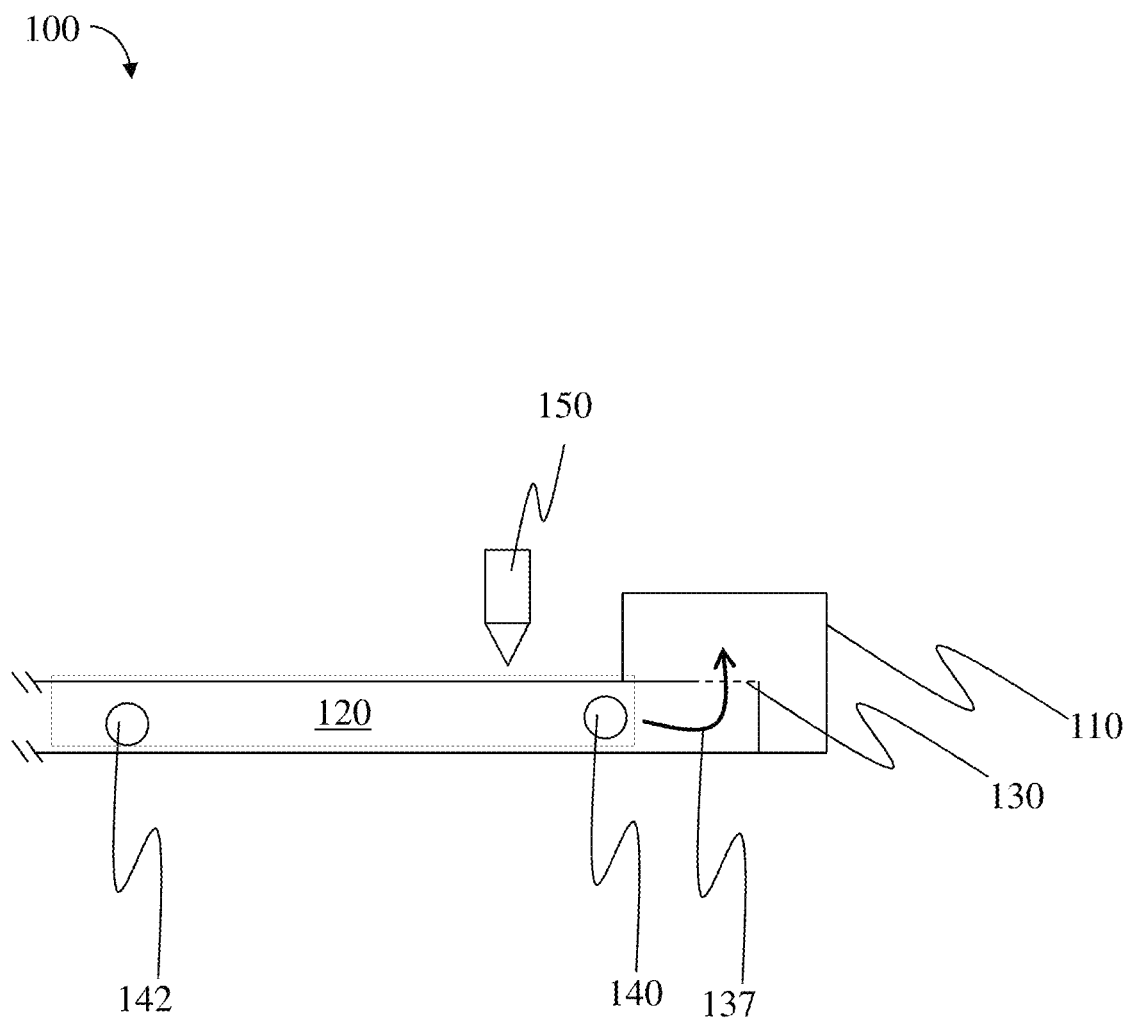
FIG. 2B is a cross-sectional side view schematic illustration of a device for directing the flow of particle, according to one set of embodiments.

In certain embodiments, the exit of the second fluidic channel is oriented orthogonal to the direction of flow of a fluid in the first fluidic channel. For example, as illustrated in FIG. 2B, exit 130 is orthogonal to the direction of flow (e.g., the direction of fluid of a fluid in first channel 110 as indicated by arrow 160 in FIG. 2A) of a fluid in first channel 110. In an exemplary embodiment, a particle (e.g., exemplary particle 140) follows fluidic flow path out of the exit of the second fluidic channel into the first fluidic channel that is (or at least a portion of is) orthogonal to the fluidic flow path of a fluid in the first fluidic channel. For example, in an exemplary embodiment, exemplary particle 140 follows fluidic flow path 135 out of exit 130 of second fluidic channel 120. In some embodiments, after exiting exit 130 of second fluidic channel 120 into first fluidic channel 110, exemplary particle 140 flows in a direction orthogonal to the direction of fluidic flow in second fluidic channel 120 (e.g., exemplary particle 140 flows in direction indicated by arrow 160 in FIG. 2A). Advantageously, in certain embodiments, the flow of one or more particles in first fluidic channel 110 (after exiting exit 130) is directed (e.g., focused) at or near the center (e.g., longitudinal axis 115 of first fluidic channel 110) of the first fluidic channel.

Those of ordinary skill in the art would understand that while FIG. 2A illustrates exit 130 as orthogonal to the direction of flow (e.g., arrow 160) of first fluidic channel 110, such illustration is intended to be non-limiting and that any suitable non-zero angle between exit 130 and first fluidic channel 110 may also be possible (e.g., an angle between first fluidic channel 110 and exit 130 of greater than or equal to 15 degrees and less than or equal to 90 degrees, greater than or equal to 15 degrees and less than or equal to 45 degrees, greater than or equal to 30 degrees and less than or equal to 60 degrees, greater than or equal to 45 degrees and less than or equal to 75 degrees, greater than or equal to 60 degrees and less than or equal to 90 degrees, or greater than or equal to 75 degrees and less than or equal to 90 degrees). In some embodiments, as illustrated in FIG. 2A, first fluidic channel 110 comprises outlet 170. In certain embodiments, a particle may be collected from outlet 170 (e.g., into a vessel such as a conical tube, petri-dish, or the like). In some such embodiments, one or more particles may be flowed in second fluidic channel 120 and exit second fluidic channel 120 via exit 130 into first fluidic channel 110, such that it may be collected at outlet 170. In some embodiments, at least one pressure source (e.g., first pressure source 190, second pressure source 195) is associated with and/or in fluidic communication with the first fluidic channel. For example, as illustrated in FIG. 1, in some embodiments, first pressure source 190 is in fluidic communication with first fluidic channel 110. In certain embodiments, second pressure source 195 is in fluidic communication with second fluidic channel 110. In some embodiments, first pressure source 190 and/or second pressure source 195 are upstream of second fluidic channel 120 (e.g., such that, upon application of pressure to a fluid in fluidic channel 110, at least a portion of the fluid enters fluidic channel 120). Each pressure source may comprise any suitable means for providing pressure to a fluid disposed within fluidic channel 110. For example, in some embodiments, each pressure source may be a pump such as a syringe pump, a suction pump, a vacuum pump, a gas source, or any other suitable pressure source, (e.g., which may act like a source or a sink). In some embodiments, each pressure source may not be in direct fluidic communication with the first fluidic channel. That is to say, in certain embodiments, one or more intervening fluidic channel(s) or fluidic region(s) (e.g., fluidic reservoirs) of the device may be present between the pressure source and the first fluidic channel.

Referring to FIG. 2A, in some embodiments, pressure source 192 is in fluidic communication with first fluidic channel 110. In some embodiments, pressure source 192 is upstream of second fluidic channel 120 and applied to a fluid in first fluidic channel 110 (e.g., such that, upon application of pressure to a fluid in first fluidic channel 110, a particle exiting exit 130 of second fluidic channel 120 is captured by the flow of the fluid). The pressure source may comprise any suitable means for providing pressure to a fluid disposed within fluidic channel 110. For example, in some embodiments, the pressure source may be a pump such as a syringe pump, a suction pump, a vacuum pump, a gas source, or any other suitable pressure source, (e.g., which may act like a source or a sink). In some embodiments, the pressure source may not be in direct fluidic communication with the first fluidic channel. That is to say, in certain embodiments, one or more intervening fluidic channel(s) or fluidic region(s) (e.g., fluidic reservoirs) of the device may be present between the pressure source and the first fluidic channel.

In certain embodiments, each channel (e.g., first fluidic channel 110 and/or second fluidic channel 120) of the system has a particular average cross-sectional dimension. The "cross-sectional dimension" (e.g., a width, a height, a radius) of the channel is measured perpendicular to the direction of fluid flow. In some embodiments, the average cross-sectional dimension of one or more fluidic channels (e.g., the first fluidic channel, the second fluidic channel) is less than or equal to 2 mm, less than or equal to 1 mm, less than or equal to 800 microns, less than or equal to 600 microns, less than or equal to 500 microns, less than or equal to 400 microns, less than or equal to 300 microns, less than or equal to 200 microns, less than or equal to 100 microns, less than or equal to 50 microns, less than or equal to 25 microns, less than or equal to 20 microns, less than or equal to 15 microns, or less than or equal to 10 microns. In certain embodiments, the average cross-sectional dimension of the channel is greater than or equal to 5 microns, greater than or equal to 10 microns, greater than or equal to 15 microns, greater than or equal to 20 microns, greater than or equal to 25 microns, greater than or equal to 50 microns, greater than or equal to 100 microns, greater than or equal to 200 microns, greater than or equal to 300 microns, greater than or equal to 400 microns, greater than or equal to 500 microns, greater than or equal to 600 microns, greater than or equal to 800 microns, or greater than or equal to 1 mm. Combinations of the above-referenced ranges are also possible (e.g., greater than or equal to 5 microns and less than or equal to 2 mm, greater than or equal to 50 microns and less than or equal to 2 mm). Other ranges are also possible. In some embodiments, one or more channels may be a microfluidic channel. "Microfluidic channels" generally refer to channels having an average cross-sectional dimension of less than 1 mm.

In some embodiments, a ratio of the average cross-sectional dimension of the first fluidic channel and the average cross-sectional dimension of the second fluidic channel intersecting the first fluidic channel may be designed such that the resistance to flow into the second fluidic channel may be controlled. For example, the ratio of the average cross-sectional dimension of the first fluidic channel to the average cross-sectional dimension of the second fluidic channel may be designed such that the system has a lower resistance to flow in the first fluidic channel than the resistance to flow of in the second fluidic channel intersecting the first fluidic channel for a given pressure drop. In some embodiments, the ratio of the average cross-sectional dimension of the first fluidic channel to the average cross-sectional dimension of the second fluidic channel is at least 1, at least 1.25, at least 1.5, at least 1.75, at least 2, at least 2.5, at least 3, at least 3.5, at least 4, at least 5, at least 6, at least 7, at least 8, or at least 9. In certain embodiments, the ratio of the average cross-sectional dimension of the first fluidic channel to the average cross-sectional dimension of the second fluidic channel is less than or equal to 10, less than or equal to 9, less than or equal to 8, less than or equal to 7, less than or equal to 6, less than or equal to 5, less than or equal to 4, less than or equal to 3.5, less than or equal to 3, less than or equal to 2.5, less than or equal to 2, less than or equal to 1.75, less than or equal to 1.5, or less than or equal to 1.25. Combinations of the above-referenced ranges are also possible (e.g., at least 1 and less than or equal to 10). Other ranges are also possible.

Referring again to FIG. 1, in certain embodiments, a detector 150 is positioned proximate intersection 130 and adjacent fluidic channel 120 (e.g., such that detector 150 is configured and arranged to detect a particle entering fluidic channel 120 via intersection 130). In some embodiments, the detector is selected from the group consisting of optical detectors (e.g., fluorescence detectors, refractive index detectors, visible light and/or UV detectors, microscopes), mass sensors, capacitive sensors, resistive pulse sensors, electrical current sensors, MEMS pressure sensors, acoustic sensors, ultrasonic sensors, and thermal sensors. In some embodiments, the detector is a suspended microchannel resonator. In certain embodiments, detector 150 is configured and arranged to detect a particle entering fluidic channel 120 at or proximate to intersection 130 such that, upon entry of the particle into fluidic channel 120, at least one property (e.g., magnitude of applied pressure) of the one or more of the pressure source(s) is changed.

Referring again to FIG. 2A, in certain embodiments, a detector 150 is positioned proximate second fluidic channel 120 (e.g., such that detector 150 is configured and arranged to detect a particle exiting (or about to exit) second fluidic channel 120 via exit 130). In some embodiments, the detector is selected from the group consisting of optical detectors (e.g., fluorescence detectors, refractive index detectors, visible light and/or UV detectors, microscopes), mass sensors, capacitive sensors, resistive pulse sensors, electrical current sensors, MEMS pressure sensors, acoustic sensors, ultrasonic sensors, and thermal sensors. In some embodiments, the detector is a suspended microchannel resonator. In certain embodiments, detector 150 is configured and arranged to detect a particle exiting (or about to exit) second fluidic channel 120 at or proximate to exit 130 such that, upon exit of the particle into first fluidic channel 110, at least one property (e.g., magnitude of applied pressure) of the one or more of the pressure source(s) is changed. For example, in some embodiments, the magnitude of pressure applied by pressure source 190 may be increased upon detection of a particle near exit 130, such that the particle is captured by the flow of a fluid in first fluidic channel 1 and/or so that only a single particle is captured. In certain embodiments, the applied pressure after capturing a single particle is increased such that no additional particles exit the exit of the second fluidic channel for a desired amount of time (e.g., greater than or equal to 10 seconds).

In some embodiments, the detector is located less than or equal to 5 mm, less than or equal to 4 mm, less than or equal to 3 mm, less than or equal to 2 mm, less than or equal to 1 mm, less than or equal to 900 microns, less than or equal to 800 microns, less than or equal to 700 microns, less than or equal to 600 microns, less than or equal to 500 microns, less than or equal to 400 microns, less than or equal to 300 microns, or less than or equal to 200 microns upstream from the exit of the second fluidic channel. In certain embodiments, the detector is located greater than or equal to 100 microns, greater than or equal to 200 microns, greater than or equal to 300 microns, greater than or equal to 400 microns, greater than or equal to 500 microns, greater than or equal to 600 microns, greater than or equal to 700 microns, greater than or equal to 800 microns, greater than or equal to 900 microns, greater than or equal to 1 mm, greater than or equal to 2 mm, greater than or equal to 3 mm, or greater than or equal to 4 mm upstream from the exit of the second fluidic channel. Combinations of the above-referenced ranges are also possible (e.g., less than or equal to 5 mm and greater than or equal to 100 microns). Other ranges are also possible.

Figure 3A:
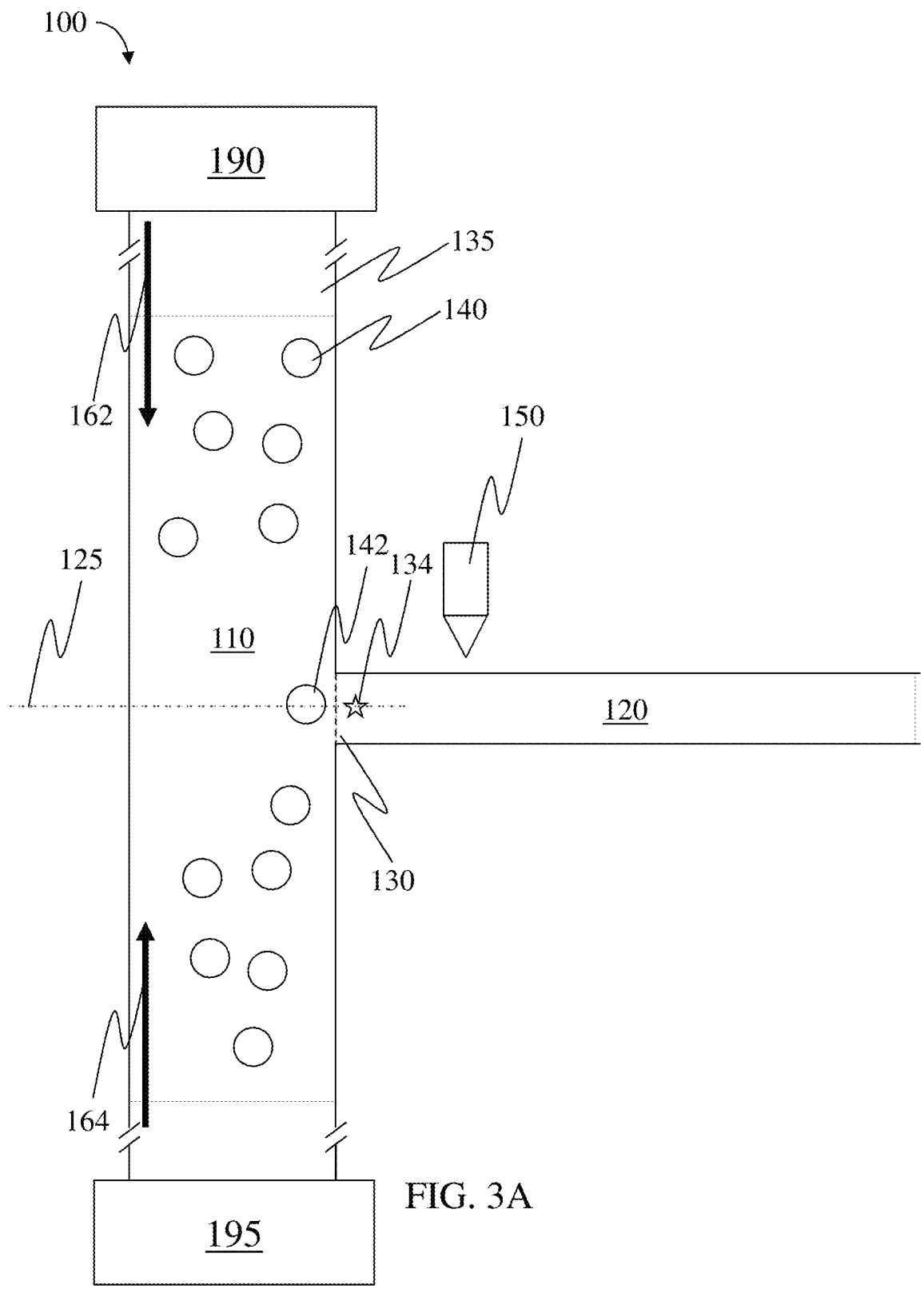
FIG. 3A is a schematic illustration of a system for flowing a particle, according to one set of embodiments.

As described herein, in some embodiments, a fluid comprising a plurality of particles may be introduced to the first fluidic channel. In some embodiments, a single particle from the plurality of particles enters the second fluidic channel intersecting the first fluidic channel (i.e. active loading regime). For example, referring now to FIG. 3A (e.g., illustrating an active loading regime), fluid 135 comprising plurality of particles 140 may be introduced to, and flowed within, first fluidic channel 110. In some embodiments, at least a portion of fluid 135 (e.g., comprising plurality of particles 140) is flowed in a first direction, as indicated by arrow 162. For example, first pressure source 190 may be configured such that at least a portion of fluid 135 in first fluidic channel 110 flows in the first direction, as indicated by arrow 162. In certain embodiments, at least a portion of fluid 135 (e.g., comprising plurality of particle 140) is flowed in a second direction, as indicated by arrow 164. For example, second pressure source 195 may be configured such that at least a portion of fluid 135 in first fluidic channel 110 flows in the second direction, as indicated by arrow 164. The term 'active loading regime' as used herein generally refers to the steps corresponding to the introduction of one or more particles into the second fluidic channel from the first fluidic channel, as described herein. The term 'flushing regime' as used herein generally refers to the steps corresponding to the flow of a fluid comprising a plurality of particles in the first fluidic channel, wherein no particles enter the second fluidic channel from the first fluidic channel, as described herein.

In some embodiments, fluid 135 is flowed in direction 162 and direction 164 such that at least a portion of fluid 135 enters channel 120 at intersection 130. In certain embodiments, exemplary particle 142 (e.g., a single particle from plurality of particles 140) enters channel 120. Detector 150 may detect the entry of particle 142 into channel 120 at intersection 130 (or at a location, detection position 134, proximate to and downstream of intersection 130). In some embodiments, the detection location (e.g., detection position 134) may be less than or equal to 5 mm, less than or equal to 4 mm, less than or equal to 3 mm, less than or equal to 2 mm, less than or equal to 1 mm, less than or equal to 900 microns, less than or equal to 800 microns, less than or equal to 700 microns, less than or equal to 600 microns, less than or equal to 500 microns, less than or equal to 400 microns, less than or equal to 300 microns, or less than or equal to 200 microns downstream from the intersection between the first fluidic channel and the second fluidic channel. In certain embodiments, the detection location is greater than or equal to 100 microns, greater than or equal to 200 microns, greater than or equal to 300 microns, greater than or equal to 400 microns, greater than or equal to 500 microns, greater than or equal to 600 microns, greater than or equal to 700 microns, greater than or equal to 800 microns, greater than or equal to 900 microns, greater than or equal to 1 mm, greater than or equal to 2 mm, greater than or equal to 3 mm, or greater than or equal to 4 mm downstream from the intersection between the first fluidic channel and the second fluidic channel. Combinations of the above-referenced ranges are also possible (e.g., less than or equal to 5 mm and greater than or equal to 100 microns). Other ranges are also possible.

In some embodiments, a single particle (e.g., a single biological entity) may be separated from a plurality of particles. In some embodiments, the density of the plurality of particles in the fluid is greater than or equal to 100 particles per milliliter, greater than or equal to 250 particles per milliliter, greater than or equal to 500 particles per milliliter, greater than or equal to 1,000 particles per milliliter, greater than or equal to 2,500 particles per milliliter, or greater than or equal to 5,000 particles per milliliter of fluid. Advantageously, a single particle (e.g., a single biological entity) may be separated from a plurality of particles (e.g., plurality of biological entities) having a relatively large density of particles, using the method and systems described herein. For example, in some embodiments, the density of particles in the fluid is greater than or equal to 10,000 particles per milliliter, greater than or equal to 25,000 particles per milliliter, greater than or equal to 50,000 particles per milliliter, greater than or equal to 100,000 particles per milliliter, greater than or equal to 150,000 particles per milliliter, greater than or equal to 200,000 particles per milliliter, greater than or equal to 250,000 particles per milliliter, greater than or equal to 300,000 particles per milliliter, greater than or equal to 350,000 particles per milliliter, greater than or equal to 400,000 particles per milliliter, greater than or equal to 450,000 particles per milliliter, greater than or equal to 500,000 particles per milliliter, greater than or equal to 550,000 particles per milliliter, greater than or equal to 600,000 particles per milliliter, greater than or equal to 650,000 particles per milliliter, greater than or equal to 700,000 particles per milliliter, greater than or equal to 750,000 particles per milliliter, greater than or equal to 800,000 particles per milliliter, greater than or equal to 850,000 particles per milliliter, greater than or equal to 900,000 particles per milliliter, greater than or equal to 950,000 particles per milliliter of fluid. In certain embodiments, the density of particles in the fluid is less than or equal to 1,000,000 particles per milliliter, less than or equal to 950,000 particles per milliliter, less than or equal to 900,000 particles per milliliter, less than or equal to 850,000 particles per milliliter, less than or equal to 800,000 particles per milliliter, less than or equal to 750,000 particles per milliliter, less than or equal to 700,000 particles per milliliter, less than or equal to 650,000 particles per milliliter, less than or equal to 600,000 particles per milliliter, less than or equal to 550,000 particles per milliliter, less than or equal to 500,000 particles per milliliter, less than or equal to 450,000 particles per milliliter, less than or equal to 400,000 particles per milliliter, less than or equal to 350,000 particles per milliliter, less than or equal to 300,000 particles per milliliter, less than or equal to 250,000 particles per milliliter, less than or equal to 200,000 particles per milliliter, less than or equal to 150,000 particles per milliliter, less than or equal to 100,000 particles per milliliter, less than or equal to 50,000 particles per milliliter, or less than or equal to 25,000 particles per milliliter of fluid. In some embodiments, the density of particles in the fluid is less than or equal to 7,500 particles per milliliter, less than or equal to 5,000 particles per milliliter, less than or equal to 2,500 particles per milliliter, less than or equal to 1,000 particles per milliliter, less than or equal to 500 particles per milliliter, or less than or equal to 250 particles per milliliter. Combinations of the above-referenced ranges are also possible (e.g., greater than or equal to 100 particles per milliliter and less than or equal to 10,000 particles per milliliter, greater than or equal to 100 particles per milliliter and less than or equal to 1,000,000 particles per milliliter, greater than or equal to 10,000 particles per milliliter and less than or equal to 1,000,000 particles per milliliter, greater than or equal to 10,000 particles per milliliter and less than or equal to 750,000 particles per milliliter, greater than or equal to 500,000 particles per milliliter and less than or equal to 750,000 particles per milliliter). Other ranges are also possible. In an exemplary embodiment, the fluid comprises a plurality of biological entities such as cells, and the density of cells within the fluid is greater than or equal to 10,000 particles per milliliter and less than or equal to 750,000 particles per milliliter. Advantageously, the systems and methods described herein may enable the loading of separated particle(s) into a channel at a particular frequency (e.g., less than or equal to 1 particle per 10 seconds) and/or spacing (e.g., greater than or equal to 1 mm) irrespective of the density of particles in the fluid, as compared to passive loading of cells into channels. That is to say, in some embodiments, substantially the same method and/or system may be used to separate particles at a particular frequency and/or spacing within a channel, without diluting (or concentrating) the particles in the fluid prior to loading the fluid into the system. In some embodiments, the relatively high density of particles in the fluid are in a disordered arrangement.

In certain embodiments, detection of a particle (e.g., a biological entity) in the second fluidic channel results in a change in at least one property (e.g., magnitude of applied pressure) of at least one pressure source. Referring again to FIG. 3A, in some embodiments, a user, upon detection of a particle (e.g., exemplary particle 142) in second fluidic channel 120 (e.g., at detection position 134), changes at least one property of at least one pressure source. In certain embodiments, the change in at least one property occurs automatically (e.g., without user intervention) upon detection of a particle in the second fluidic channel intersecting the first fluidic channel.

Figure 3B:
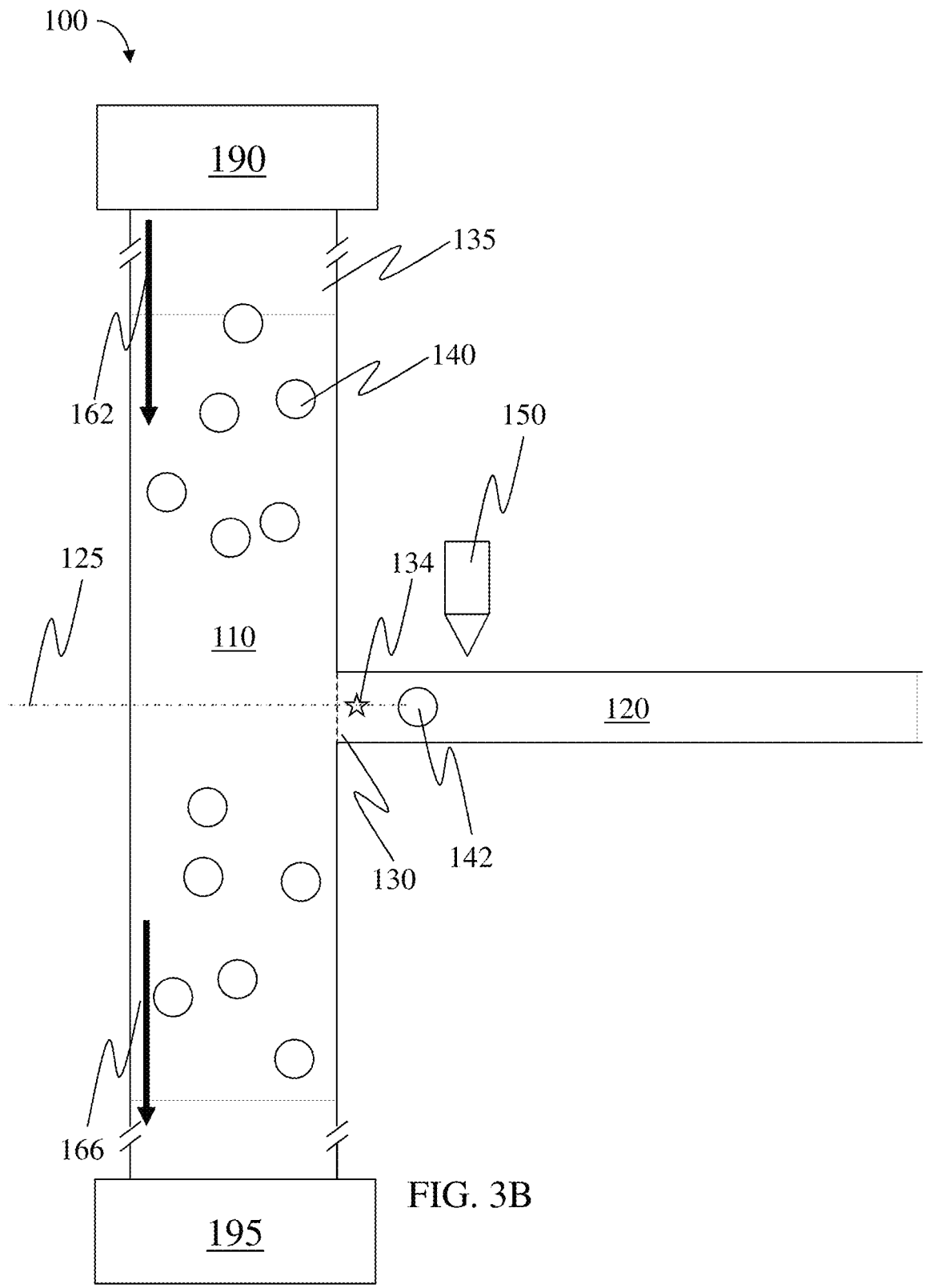
FIG. 3B is a schematic illustration of a system for flowing a particle, according to one set of embodiments.

In some embodiments, the change in at least one property of the at least one pressure source changes the direction of flow of at least a portion of the fluid within the first fluidic channel. As illustrated in FIG. 3B (e.g., illustrating a flushing regime), upon detection of exemplary particle 142 by detector 150, at least a portion of fluid 135 flows in a third direction as indicated by arrow 166 (and different than the second direction as indicated by arrow 164 in FIG. 3A). In some embodiments, the first direction (indicated by arrow 162) and the third direction (indicated by arrow 166) is the same. In certain embodiments, upon detection of a particle in the second fluidic channel, the flow of the fluid (e.g., fluid 135) in the first fluidic channel is configured such that no additional particles in the plurality of particles enter the second fluidic channel from the first fluidic channel (i.e. the flushing regime). In some embodiments, the flushing regime comprises flowing fluid 135 in substantially the same direction.

Without wishing to be bound by theory, the pressure at the intersection (e.g., intersection 130) between the first fluidic channel (e.g., first fluidic channel 110) and the second fluidic channel (e.g., second fluidic channel 120), and/or the pressure drop along the second fluidic channel, does not substantially change between the active loading regime and the flushing regime. For example, in some embodiments, the fluidic pressure drop along the second fluidic channel during the flushing regime is within less than or equal to 10%, less than or equal to 8%, less than or equal to 6%, less than or equal to 4%, less than or equal to 2%, less than or equal to 1%, less than or equal to 0.5%, less than or equal to 0.1%, or less than or equal to 0.05% of the fluidic pressure drop along the second fluidic channel during the active loading regime. In certain embodiments, the fluidic pressure drop along the second fluidic channel during the flushing regime is within greater than or equal to 0.01%, greater than or equal to 0.05%, greater than or equal to 0.1%, greater than or equal to 0.5%, greater than or equal to 1%, greater than or equal to 2%, greater than or equal to 4%, greater than or equal to 6%, or greater than or equal to 8% of the fluidic pressure drop along the second fluidic channel during the active loading regime. Combinations of the above-referenced ranges are also possible (e.g., less than or equal to 10% and greater than or equal to 0.01%). Other ranges are also possible. The change in speed at the intersection may be measured by measuring the speed of the loaded particles in second fluidic channel 120, downstream of intersection 130 by detector 150 (or by a secondary detector associated with the second fluidic channel), where the change in speed of the particle is equal to the difference between the speed of the particle at the intersection during the active loading regime and the speed of the particle during the flushing regime, expressed as a percentage of the speed of the particle at the intersection during the active loading regime. Without wishing to be bound by theory, the change in speed of the particle in the second fluidic channel is proportional to the change in pressure drop along the second fluidic channel, such that the percent change in pressure drop is equivalent to the percent change in speed of the particle in the second fluidic channel. Referring again to FIGS. 3A-3B, in an exemplary embodiment, the pressure applied by pressure source 190 and pressure source 195 during the active loading regime may be equal (e.g., such that fluid 135 flows towards second fluidic channel 120). In another exemplary embodiment, the pressure applied by pressure source 190 may be greater than the pressure applied by pressure source 195 during the flushing regime (e.g., such that fluid 135 flows in the same direction in first fluidic channel 110). For example, the pressure drop along the second fluidic channel is substantially the same whether the pressure applied by pressure source 190 and pressure source 195 are equal or whether the pressure applied by pressure source 190 and pressure source 195 are unequal (e.g., the pressure applied by pressure source 190 may be greater than the pressure applied by pressure source 195).

Advantageously, in some embodiments, the flow rate of the fluid in the second fluidic channel does not substantially change upon the change in at least one property of the at least one pressure source (e.g., such that at least a portion of the fluid in the first fluidic channel changes direction). In certain embodiments, the particle (or at least the first particle) is maintained (or flowed) within the second fluidic channel (e.g., during the flushing regime). In certain embodiments, the flow rate of the fluid (comprising the particle) in the second fluidic channel during the flushing regime is within less than or equal to 10%, less than or equal to 8%, less than or equal to 6%, less than or equal to 4%, less than or equal to 2%, less than or equal to 1%, less than or equal to 0.5%, less than or equal to 0.1%, or less than or equal to 0.05% of the flow rate of the fluid in the second fluidic channel during the active loading regime. In certain embodiments, the flow rate of the fluid in the second fluidic channel during the flushing regime is within greater than or equal to 0.01%, greater than or equal to 0.05%, greater than or equal to 0.1%, greater than or equal to 0.5%, greater than or equal to 1%, greater than or equal to 2%, greater than or equal to 4%, greater than or equal to 6%, or greater than or equal to 8% of the flow rate of the fluid in the second fluidic channel during the active loading regime. Combinations of the above-referenced ranges are also possible (e.g., less than or equal to 10% and greater than or equal to 0.01%). Other ranges are also possible.

In some embodiments, it may be desirable to flow at least a portion of the fluid in the second channel back into the first channel (e.g., to remove a piece of undesirable debris and/or a second particle e.g., detected by the detector). In some such embodiments, at least a portion of the fluid in which the single particle is suspended may be flowed out of the second channel and into the first channel while maintaining the single particle in the second channel. Those of ordinary skill in the art would understand, based upon the teachings of this specification, how to flow at least a portion of the fluid from the second channel into the first channel. For example, a pressure source downstream of the second channel may apply a pressure to the second channel, such that at least a portion of the fluid enters the first channel (while maintaining the single particle in the second channel).

In some embodiments, it may be desirable to introduce two or more particles into the second channel. For example, in some embodiments, at least a second particle (e.g., a second particle to be separated from the plurality of particles) may be flowed into the second fluidic channel. For example, in certain embodiments, after an active loading regime and a first particle enters the second fluidic channel intersecting the first fluidic channel (and is detected by the detector), the system may enter a flushing regime (e.g., such that no more particles enter the second fluidic channel). After a desired period of time (and/or distance traveled along the second fluidic channel by the first particle), the system may be switched back to the active loading regime such that a second particle may enter the second fluidic channel (e.g., at a particular frequency of entry and/or at a particular spacing from the first particle). Upon entry of the second particle into the second fluidic channel (and detection by the detector), the system may return to a flushing regime, as described herein.

Figure 3C:
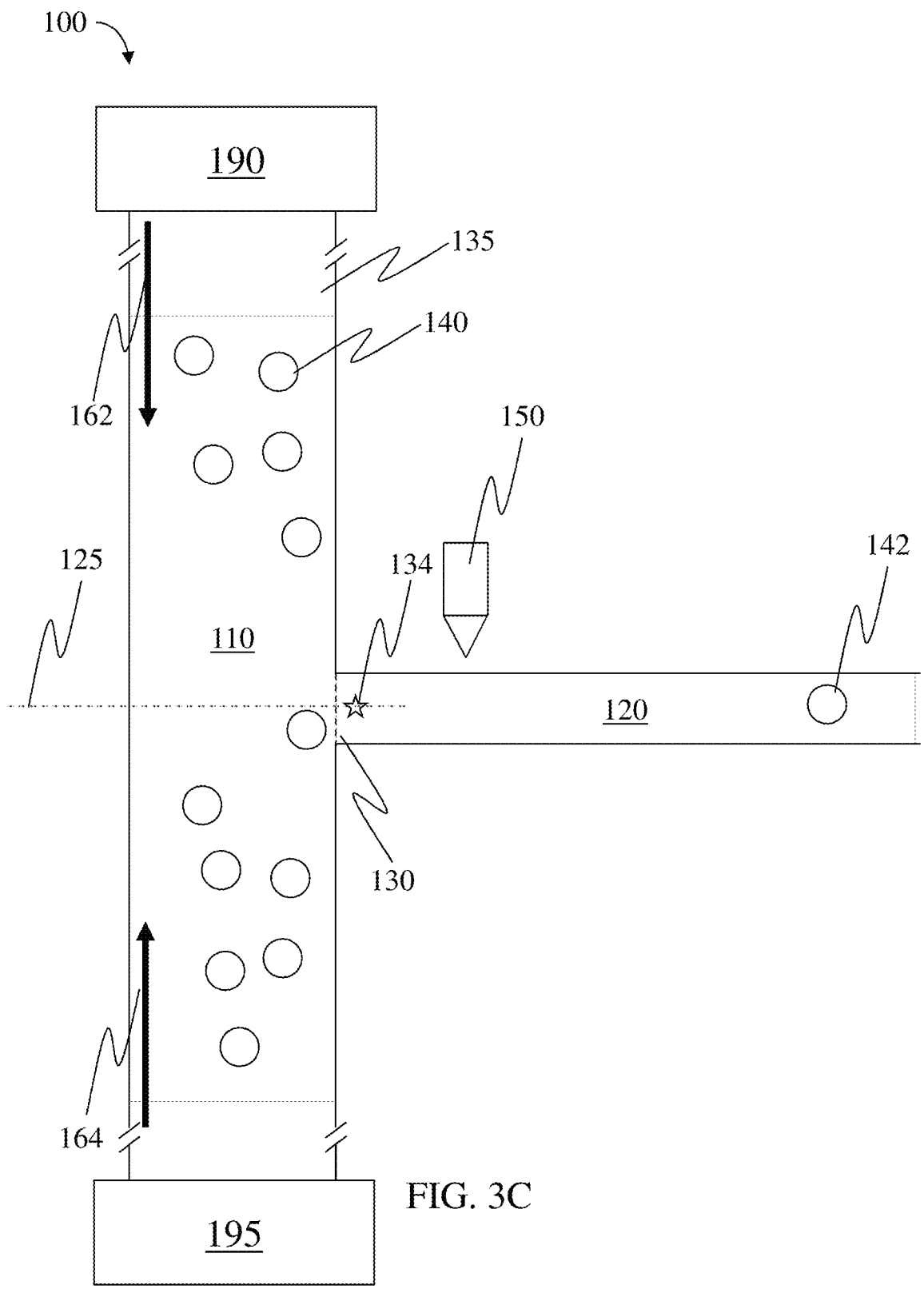
FIG. 3C is a schematic illustration of a system for flowing a particle, according to one set of embodiments.
Figure 3D:
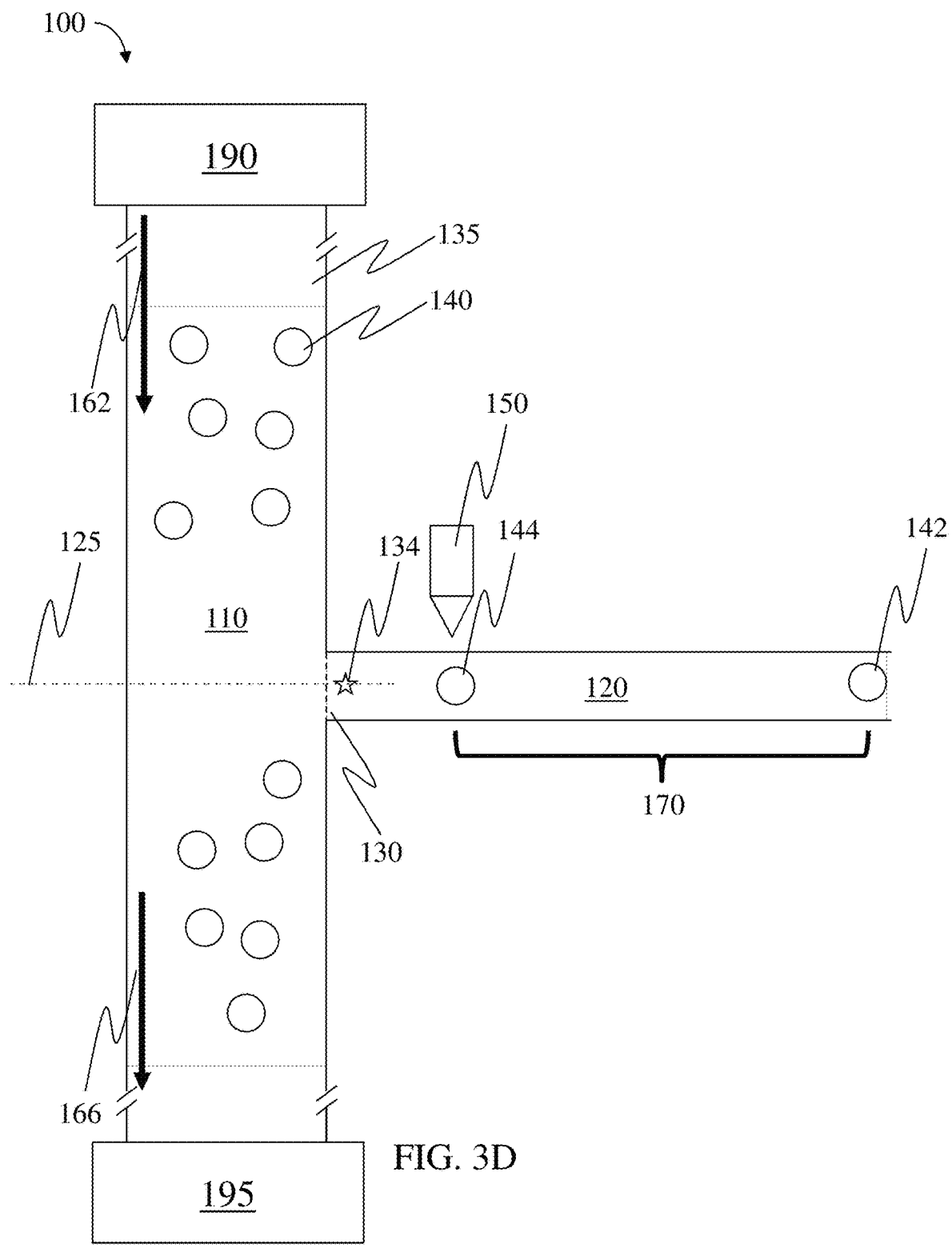
FIG. 3D is a schematic illustration of a system for flowing a particle, according to one set of embodiments.

For example, as illustrated in FIG. 3C, once exemplary particle 142 has flowed through second fluidic channel 120 for a desired length of time (or distance), the system can be switched back to an active loading regime (e.g., such that at least a portion of fluid 135 is flowed in a first direction as indicated by arrow 162 and at least a portion of fluid 135 is flowed in a second direction, different than the first direction, as indicated by arrow 164). In some such embodiments, at least one or more properties of the pressure source(s) (e.g., magnitude of the applied pressure) may be changed (e.g., such that the pressure applied by pressure source 190 and pressure source 195 is substantially the same). In certain embodiments, as illustrated in FIG. 3D, upon detection of a second exemplary particle (e.g., exemplary particle 144) by the detector in second fluidic channel 120, the system may be switched to the flushing regime (e.g., such that no additional particles enter second fluidic channel 120).

In some embodiments, the spacing between particles within the second fluidic channel (e.g., distance 170 between exemplary particle 142 and exemplary particle 144 in second fluidic channel 120) may be controlled. For example, in some embodiments, exemplary particle 142 may be flowed in second fluidic channel 120 for a particular length of time (or distance) under a flushing regime (e.g., such that no additional particles enter second fluidic channel 120). After a desired length of time (or distance), the system may be switched back to an active loading regime such that a second particle may enter second fluidic channel 120 at a desired spacing and/or frequency. As described herein, the flow rate of the fluid (and/or particle) in the second fluidic channel during the flushing regime may not be significantly different than the flow rate of the fluid (and/or particle) in the second fluidic channel during the active loading regime.

Figure 3E:
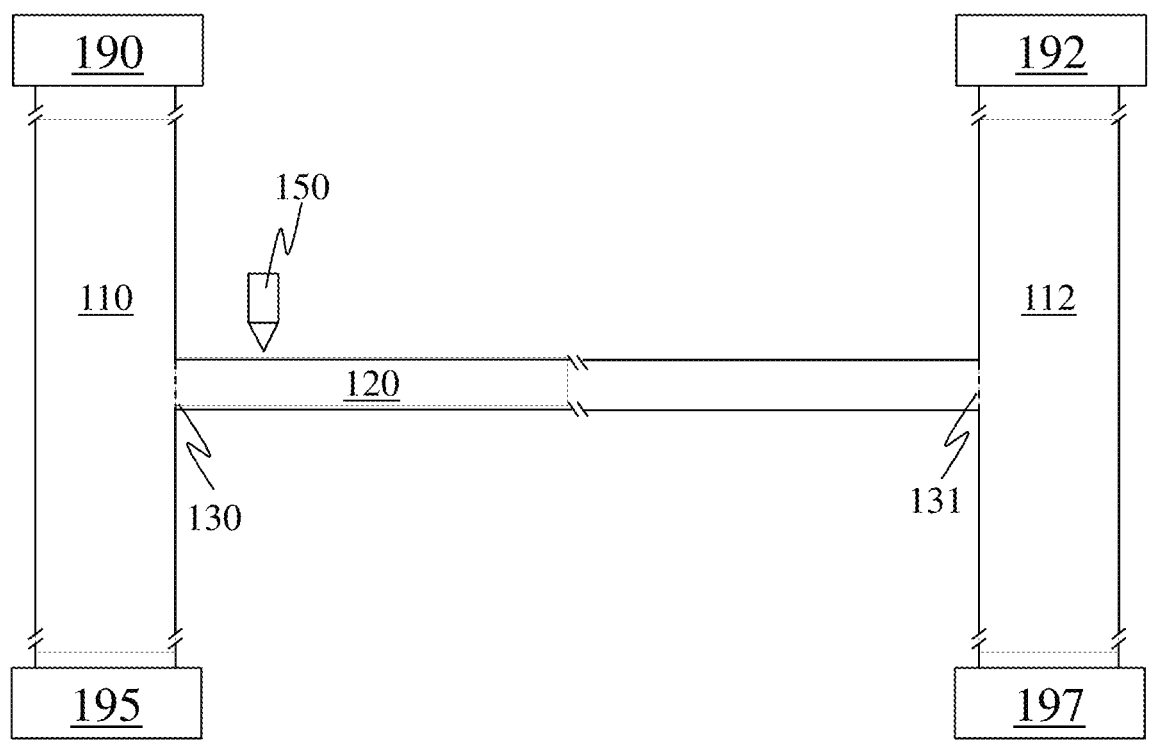
FIG. 3E is a schematic illustration of a system for flowing a particle, according to one set of embodiments.

Referring again to FIG. 2B, in some embodiments, the spacing between particles within the second fluidic channel (e.g., distance 145 between exemplary particle 140 and exemplary particle 142 in second fluidic channel 120) may be controlled. For example, in some embodiments, exemplary particle 140 may be flowed in second fluidic channel 120 for a particular length of time (or distance) such that exemplary particle 140 exits the second fluidic channel at exit 130 into first fluidic channel 110. After a desired length of time (or distance), the exemplary particle 142 exits the second fluidic channel at exit 130 into first fluidic channel 110. In some such embodiments, each particle may be collected (e.g., via outlet 170) separately from one another. In certain embodiments, the article, system, and/or device comprises a third fluidic channel, such that the second fluidic channel intersects the first fluidic channel and the third fluidic channel (e.g., the second fluidic channel intersects and in disposed between the first fluidic channel and the third fluidic channel). In some embodiments, the three channels have a H-shaped geometry. One of ordinary skill in the art would understand based upon the teachings of this specification that other geometries are also possible. In some embodiments, the third fluidic channel comprises one or more pressure sources in fluidic communication with the third fluidic channel. For example, as illustrated in FIG. 3E, system 102 comprises first fluidic channel 110, third fluidic channel 112, and second fluidic channel 120 intersecting first fluidic channel 110 at intersection 130 and intersecting third fluidic channel 112 at intersection 131. In some embodiments, at least one pressure source (e.g., third pressure source 192, fourth pressure source 197) is associated with and/or in fluidic communication with third fluidic channel 112. In some embodiments, the system may be designed such that the pressure at the intersection (e.g., intersection 130) between the first fluidic channel and the second fluidic channel, and/or the flow rate within the second fluidic channel, may be controlled, independent of the flow rate of the fluid in the first channel. In certain embodiments, a pressure may be applied (e.g., by one or more pressure sources associated with and/or in fluidic communication with) to the third fluidic channel (e.g., third fluidic channel 112) such that the flow rate of the fluid in the second fluidic channel is controlled (e.g., maintained substantially) constant, independent to the flow rate of the fluid in the first fluidic channel. In some embodiments, the flow rate of the fluid in the second fluidic channel is substantially similar during the active loading regime and the flushing regime. In some embodiments, the pressure may be applied to the third fluidic channel such that the average spacing between particles is controlled.

Referring again to FIG. 3D, in some embodiments, the average spacing (e.g., distance 170) between particles (e.g., exemplary particle 142 and exemplary particle 144) within the second fluidic channel (e.g., second fluidic channel 120) may be at least 1 mm. For example, in certain embodiments, particles within the second fluidic channel may be spaced at an average spacing of at least 20 microns, at least 50 microns, at least 100 microns, at least 250 microns, at least 500 microns, at least 750 microns, at least 1 mm, at least 1.5 mm, at least 2 mm, at least 2.5 mm, at least 3 mm, at least 4 mm, at least 5 mm, at least 10 mm, at least 15 mm, at least 20 mm, at least 25 mm, at least 30 mm, at least 35 mm, at least 40 mm, at least 45 mm, at least 50 mm, at least 75 mm, at least 100 mm, at least 250 mm, or at least 400 mm apart along the longitudinal axis of the second fluidic channel. In some embodiments, particles within the second fluidic channel may be spaced at an average spacing of less than or equal to 500 mm, less than or equal to 400 mm, less than or equal to 250 mm, less than or equal to 100 mm, less than or equal to 75 mm, less than or equal to 50 mm, less than or equal to 45 mm, less than or equal to 40 mm, less than or equal to 35 mm, less than or equal to 30 mm, less than or equal to 25 mm, less than or equal to 20 mm, less than or equal to 15 mm, less than or equal to 10 mm, less than or equal to 5 mm, less than or equal to 4 mm, less than or equal to 3 mm, less than or equal to 2.5 mm, less than or equal to 2 mm, less than or equal to 1.5 mm, less than or equal to 1 mm, less than or equal to 750 microns, less than or equal to 500 microns, less than or equal to 250 microns, less than or equal to 100 microns, or less than or equal to 50 microns apart along the longitudinal axis of the second fluidic channel. Combinations of the above-referenced ranges are also possible (e.g., at least 20 microns and less than or equal to 500 mm, at least 20 microns and less than or equal to 5 mm, at least 1 mm and less than or equal to 50 mm, at least 1 mm and less than or equal to 500 mm). Other ranges are also possible.

Referring again to FIG. 2B, in some embodiments, the average spacing (e.g., distance 145) between particles (e.g., exemplary particle 140 and exemplary particle 142) within the second fluidic channel (e.g., second fluidic channel 120) may be at least 1 mm. For example, in certain embodiments, particles within the second fluidic channel may be spaced at an average spacing of at least 20 microns, at least 50 microns, at least 100 microns, at least 250 microns, at least 500 microns, at least 750 microns, at least 1 mm, at least 1.5 mm, at least 2 mm, at least 2.5 mm, at least 3 mm, at least 4 mm, at least 5 mm, at least 10 mm, at least 15 mm, at least 20 mm, at least 25 mm, at least 30 mm, at least 35 mm, at least 40 mm, at least 45 mm, at least 50 mm, at least 75 mm, at least 100 mm, at least 250 mm, or at least 400 mm apart along the longitudinal axis of the second fluidic channel. In some embodiments, particles within the second fluidic channel may be spaced at an average spacing of less than or equal to 500 mm, less than or equal to 400 mm, less than or equal to 250 mm, less than or equal to 100 mm, less than or equal to 75 mm, less than or equal to 50 mm, less than or equal to 45 mm, less than or equal to 40 mm, less than or equal to 35 mm, less than or equal to 30 mm, less than or equal to 25 mm, less than or equal to 20 mm, less than or equal to 15 mm, less than or equal to 10 mm, less than or equal to 5 mm, less than or equal to 4 mm, less than or equal to 3 mm, less than or equal to 2.5 mm, less than or equal to 2 mm, less than or equal to 1.5 mm, less than or equal to 1 mm, less than or equal to 750 microns, less than or equal to 500 microns, less than or equal to 250 microns, less than or equal to 100 microns, or less than or equal to 50 microns apart along the longitudinal axis of the second fluidic channel. Combinations of the above-referenced ranges are also possible (e.g., at least 20 microns and less than or equal to 500 mm, at least 20 microns and less than or equal to 5 mm, at least 1 mm and less than or equal to 50 mm, at least 1 mm and less than or equal to 500 mm). Other ranges are also possible.

In certain embodiments, individual particles (e.g., biological entities) flowed in the second fluidic channel may be separated such that at least 90% (e.g., at least 95%, at least 98%, at least 99%) of the spacings differ by no more than less than 10%, less than 8%, less than 6%, less than 4%, less than 2%, or less than 1% of the average spacing between particles. In some embodiments, individual particles flowed in the second fluidic channel may be separated such that at least 90% (e.g., at least 95%, at least 98%, at least 99%) of the spacings differ by no more than greater than or equal to 0.1%, greater than or equal to 1%, greater than or equal to 2%, greater than or equal to 4%, greater than or equal to 6%, or greater than or equal to 8% of the average spacing between particles. In an exemplary embodiment, at least 90% of the particles are separated such that the spacing between particles differs by no more than 10% of the average spacing between the particles. Combinations of the above-referenced ranges are also possible (e.g., less than 10% and greater than or equal to 0.1%). Other ranges are also possible. In some embodiments, the average spacing and/or the difference in spacing between particles is determined by measuring the spacing between 5 (or more) consecutively loaded particles within the second fluidic channel.

In some cases, 2 or more, 5 or more, 10 or more, 20 or more, 50 or more, 100 or more, 200 or more, 500 or more, or 750 or more particles (e.g., biological entities) may be present in the second fluidic channel (and/or suspended microchannel resonators associated with the second fluidic channel) at a given time. In certain embodiments, less than or equal to 1000, less than or equal to 750, less than or equal to 500, less than or equal to 200, less than or equal to 100, less than or equal to 50, less than or equal to 20, less than or equal to 10, or less than or equal to 5 particles may be present in the second fluidic channel (and/or suspended microchannel resonators associated with the second fluidic channel) at a given time. Combinations of the above-referenced ranges are also possible (e.g., 2 or more and less than or equal to 1000, 100 or more and less than or equal to 1000). Other ranges are also possible.

Figure 5:
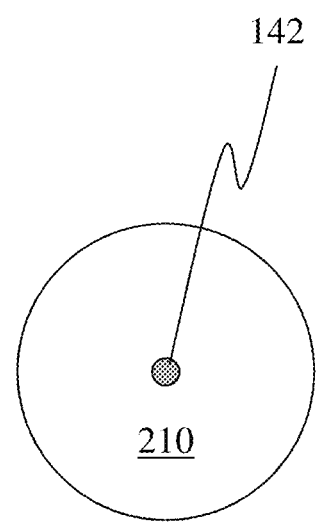
FIG. 5 is a top-down view schematic illustration of an article comprising isolated particles in a plurality of fluidically isolated surfaces, according to one set of embodiments.
Figure 5:
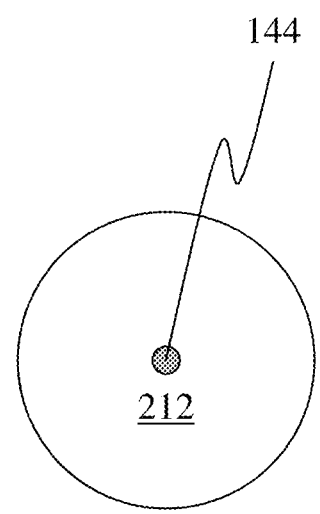

As illustrated in FIG. 5, in some embodiments, article 200 comprises a plurality of fluidically isolated surfaces (e.g., exemplary fluidically isolated surface 210 and isolated surface 212). In certain embodiments, a single particle (e.g., biological entity) is associated with each fluidically isolated surface. For example, exemplary particle 142 is associated with fluidically isolated surface 210 and exemplary particle 144 is associated with fluidically isolated surface 212. In some embodiments, the plurality of particles (e.g., a plurality of biological entities) are provided (e.g., suspended) in a fluid (e.g., a liquid). In a particular set of embodiments, the fluid is a liquid. In some embodiments, the fluid comprises water, a reagent, a solvent, a buffer, a cell-growth medium, or combinations thereof. In certain embodiments, the particles are relatively soluble in the fluid. In some embodiments, the fluid does not comprise a colloid (e.g., such as an emulsion). For example, in some embodiments, the particle (e.g., biological entity) is not disposed (and/or encapsulated) by a first fluid that is immiscible with, and surrounded by, a second fluid different than the first fluid. However, one of ordinary skill in the art, based upon the teachings of this specification, would understand that the systems and methods described herein may be used for separating a single colloid into a channel from a plurality of colloids.

Those of ordinary skill in the art would understand, based upon the teaching of this specification, that the single particle associated with a fluidically isolated surface may be in fluidic communication with the fluidically isolated surface. That is to say, the single particle may be suspended and/or in contact with a fluid that is also in contact with the surface. The term "associated with" as used herein means generally held in close proximity, for example, a single particle associated with a fluidically isolated surface may be adjacent the surface. As used herein, when a particle is referred to as being "adjacent" a surface, it can be directly adjacent to (e.g., in contact with) the surface, or one or more intervening components (e.g., a liquid) also may be present. A particle that is "directly adjacent" a surface means that no intervening component(s) is present.

Figure 6:
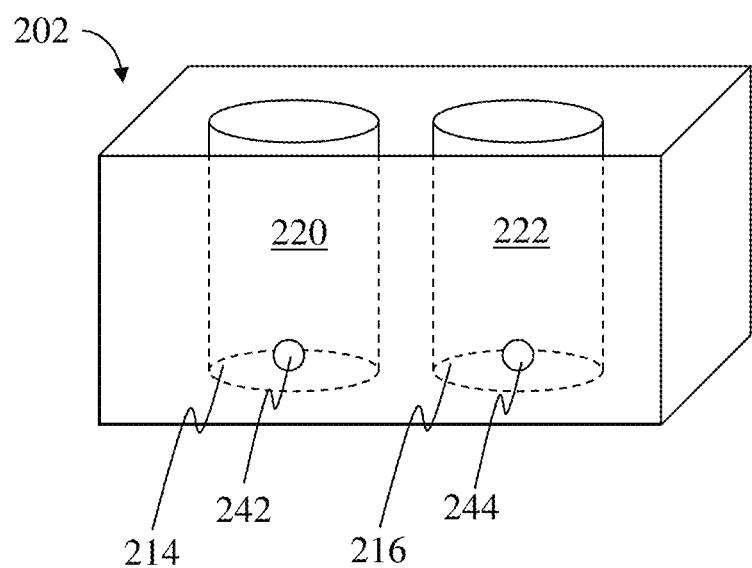
FIG. 6 is a perspective view schematic illustration of an article comprising isolated particles in a plurality of fluidically isolated surfaces, according to one set of embodiments.

In some embodiments, the plurality of fluidically isolated surfaces may be physically connected. For example, as illustrated in FIG. 6, article 202 comprises a plurality of fluidically isolated surfaces (e.g., exemplary fluidically isolated surface 2140 of well 220 and exemplary fluidically isolated surface 2162 of well 222). In some embodiments, a single particle (e.g., biological entity) is associated with each fluidically isolated surface. For example, exemplary particle 242 is associated with fluidically isolated surface 214 and exemplary particle 244 is associated with fluidically isolated surface 216. While two particles and two fluidically isolated surfaces are illustrated in FIG. 5 and FIG. 6, two or more fluidically isolated surfaces and/or separated particles may be present. For example, in some embodiments, the article comprises greater than or equal to 2, greater than or equal to 4, greater than or equal to 6, greater than or equal to 12, greater than or equal to 24, greater than or equal to 48, greater than or equal to 96, greater than or equal to 384 fluidically isolated surfaces. In certain embodiments, the article comprises less than or equal to 1536, less than or equal to 384, less than or equal to 96, less than or equal to 48, less than or equal to 24, less than or equal to 12, less than or equal to 6, or less than or equal to 4 fluidically isolated surfaces. Combinations of the above-referenced ranges are also possible (e.g., greater than or equal to 2 and less than or equal to 1536). Other ranges are also possible. In some embodiments, a plurality of particles are associated with the fluidically isolated surfaces such that each fluidically isolated surfaces is associated with a single particle (i.e. isolated particles) from the plurality of particles. In certain embodiments, isolated particles are associated with at least 75%, at least 80%, at least 85%, at least 90%, at least 95%, at least 98%, or at least 99% of the fluidically isolated surfaces.

In certain embodiments, the article, system, and/or device comprises a multi-well plate (e.g., a multi-well cell culture plate) such as a 6-well, 12-well, 24-well, 48-well, 96-well, 384-well, or 1536 well plate. In some embodiments, the article comprises an ANSI multi-well (e.g., microtiter) plate. For example, in some cases, the article may comprise a 96-well, 384-well, or 1536-well plate designed according the ANSI SLAS 4-2004 (R2012) standard. In some embodiments, the article comprises a plurality of conical tubes (e.g., greater than or equal to 2 and less than or equal to 1536 conical tubes). In certain embodiments, the article comprises a plurality of dishes such as petri dishes (e.g., greater than or equal to 2 and less than or equal to 1536 petri dishes).

The fluidically isolated surfaces may comprise any suitable material. Non-limiting examples of suitable materials include polyethylene, polystyrene, polypropylene, cyclic olefin copolymers, vinyl (e.g., polyvinyl chloride), and combinations thereof.

In some embodiments, the fluidically isolated surface is a cell-culture surface (e.g., the surface(s) may be treated such that cells may adhere and/or grow on the surface). Cell-culture surfaces are known in the art and those of ordinary skill in the art would understand, based upon the teachings of this specification, how to select cell-culture surfaces for use with the articles and methods described herein. For example, in some embodiments, at least a portion of the fluidically isolated surfaces may be coated for cell-culture (e.g., a coating comprising collagen, poly-D-lysine, poly-L-lysine, gelatin, fibronectin, laminin, or combinations thereof).

In some embodiments, the article, system, and/or device comprises greater than or equal to 2, greater than or equal to 4, greater than or equal to 6, greater than or equal to 12, greater than or equal to 24, greater than or equal to 48, greater than or equal to 96, greater than or equal to 384 particles (e.g., biological entities), each particle associated with a fluidically isolated surface. In certain embodiments, the article comprises less than or equal to 1536, less than or equal to 384, less than or equal to 96, less than or equal to 48, less than or equal to 24, less than or equal to 12, less than or equal to 6, or less than or equal to 4 particles (e.g., biological entities), each particle associated with a fluidically isolated surface. Combinations of the above-referenced ranges are also possible (e.g., greater than or equal to 2 and less than or equal to 1536). Other ranges are also possible.

The particles may be separated from a relatively concentrated source of particles. In certain embodiments, the particles may be separated without subsequent and/or significant dilution of the source and/or without the application of relatively high shear forces being applied to the particles. For example, a relatively high density plurality of particles (e.g., biological entities) may be introduced to a fluidic channel and a single particle from the plurality of particles may be flowed into an intersecting fluidic channel and separated from the plurality of particles without diluting the plurality of particles. In some such cases, multiple particles may be flowed into the intersecting fluidic channel from the plurality of particles such that each particle in the intersecting fluidic channel are spaced apart with a relatively uniform and large average spacing (e.g., at least 1 mm apart).

Figure 7:
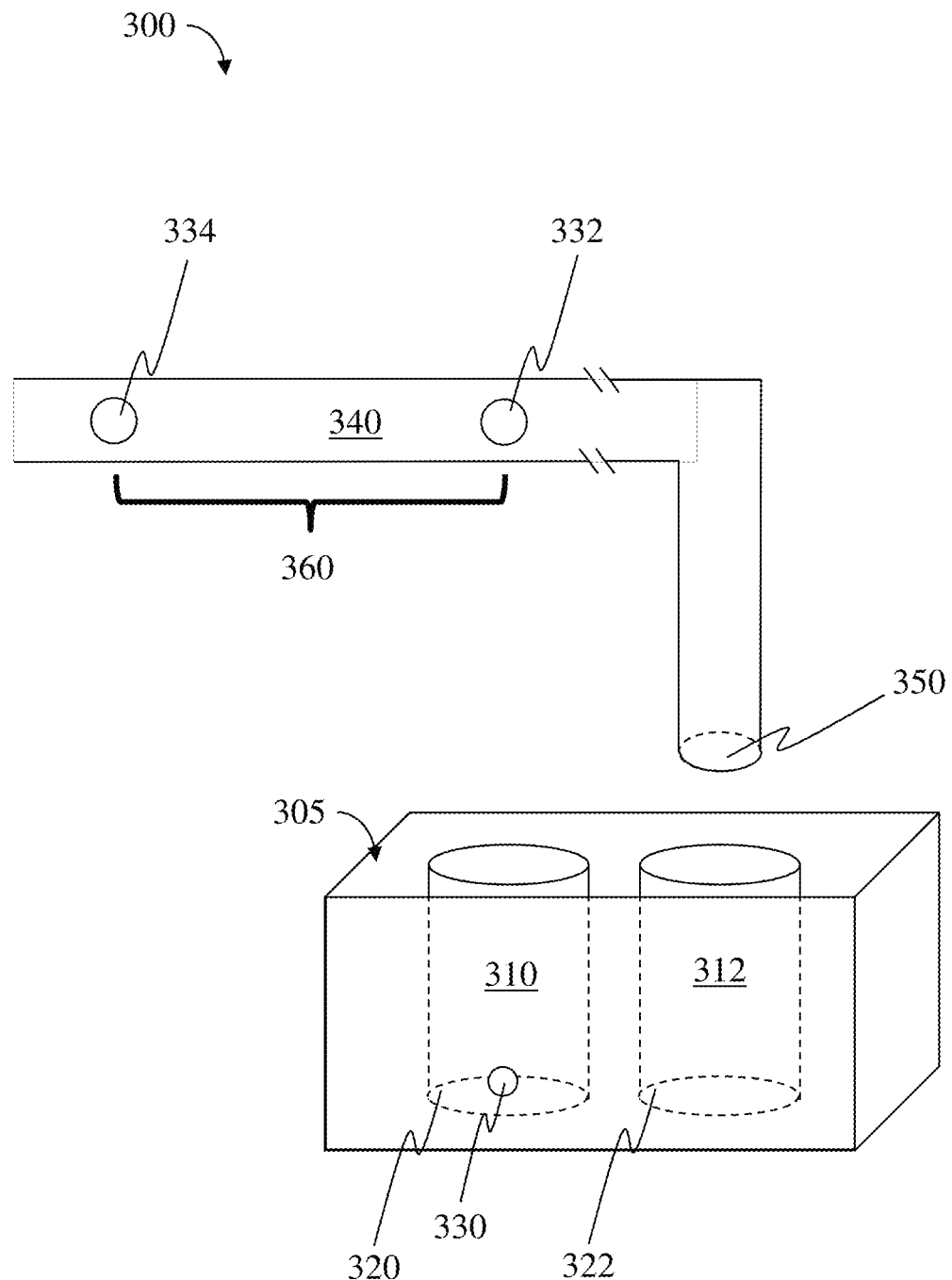
FIG. 7 is a perspective view schematic illustration of a system for collecting particles in fluidically isolated surfaces, according to one set of embodiments.

In an exemplary embodiment, as illustrated in FIG. 7, system 300 comprises article 305 comprising a plurality of fluidically isolated surfaces (e.g., exemplary fluidically isolated surface 320 of well 310 and fluidically isolated surface 322 of well 312). In some embodiments, system 300 comprises a fluidic channel 340 comprising a plurality of particles (e.g., particle 332 and particle 334) such that the particles are spaced apart with a relatively uniform and large average spacing (e.g., at least 1 mm apart). Advantageously, the relatively large and uniform average spacing of the plurality of particles in the channel may enable the isolation of single particles in single wells (or single fluidically isolated surfaces) from a plurality of particles. As illustrated in FIG. 7, exemplary particle 332 and particle 334 may be spaced apart at an average spacing (as indicated by distance 360). Distance 360 (e.g., the average spacing between particles in the channel) is generally determined using the geometric center of each particle.

In some embodiments, each particle may be flowed in a fluidic channel and introduced to each fluidically isolated surface. Referring again to FIG. 7, in an exemplary embodiment, channel 340 comprises outlet 350, and outlet 350 may be positioned proximate well 312 such that particle 332 may be introduced to well 312 and associated with fluidically isolated surface 322. In some embodiments, a fluid (e.g., a liquid) may be present in channel 340 such that at least a portion of the fluid is introduced to the fluidically isolated surface. In some embodiments, a stage (e.g., a motorized stage) may be associated with the article (e.g., article 305) such that the article is moved with respect to the outlet of the fluidic channel. In some such embodiments, the stage may be moved after the introduction of a particle to each fluidically isolated surface, such that a single cell is introduced onto each fluidically isolated surface. In some embodiments, a detector associated with the fluidic channel may be used to determine when a cell is approaching the outlet of the channel such that the (next) fluidically isolated surface may be positioned proximate the outlet (such that a single particle may be introduced to the fluidically isolated surface).

In some embodiments, a liquid introduced to the fluidically isolated surface with the particle (e.g., biological entity) has a relatively low volume. For example, in some embodiments, the volume of liquid associated with the particle and the fluidically isolated surface is less than or equal to 100 microliters, less than or equal to 90 microliters, less than or equal to 80 microliters, less than or equal to 70 microliters, less than or equal to 60 microliters, less than or equal to 50 microliters, less than or equal to 40 microliters, less than or equal to 30 microliters, less than or equal to 20 microliters, less than or equal to 10 microliters, less than or equal to 9 microliters, less than or equal to 8 microliters, less than or equal to 7 microliters, less than or equal to 6 microliters, less than or equal to 5 microliters, less than or equal to 4 microliters, less than or equal to 3 microliters, less than or equal to 2 microliters, less than or equal to 1 microliter, less than or equal to 0.5 microliters, or less than or equal to 0.2 microliters. In certain embodiments, the volume of liquid associated with the particle and the fluidically isolated surface is greater than or equal to 0.1 microliters, greater than or equal to 0.2 microliters, greater than or equal to 0.5 microliters, greater than or equal to 1 microliter, greater than or equal to 2 microliters, greater than or equal to 3 microliters, greater than or equal to 4 microliters, greater than or equal to 5 microliters, greater than or equal to 6 microliters, greater than or equal to 7 microliters, greater than or equal to 8 microliters, greater than or equal to 9 microliters, greater than or equal to 10 microliters, greater than or equal to 20 microliters, greater than or equal to 30 microliters, greater than or equal to 40 microliters, greater than or equal to 50 microliters, greater than or equal to 60 microliters, greater than or equal to 70 microliters, greater than or equal to 80 microliters, or greater than or equal to 90 microliters. Combinations of the above-referenced ranges are also possible (e.g., greater than or equal to 0.1 microliter and less than or equal to 100 microliters, greater than or equal to 0.1 microliter and less than or equal to 10 microliters). Other ranges are also possible. In some cases, the device may be configured such that the volume in which a single particle is collected from the outlet is relatively low. For example, in some embodiments, the volume of liquid associated with the particle collected from the outlet of the first fluidic channel is less than or equal to 100 microliters, less than or equal to 90 microliters, less than or equal to 80 microliters, less than or equal to 70 microliters, less than or equal to 60 microliters, less than or equal to 50 microliters, less than or equal to 40 microliters, less than or equal to 30 microliters, less than or equal to 20 microliters, less than or equal to 10 microliters, less than or equal to 9 microliters, less than or equal to 8 microliters, less than or equal to 7 microliters, less than or equal to 6 microliters, less than or equal to 5 microliters, less than or equal to 4 microliters, less than or equal to 3 microliters, less than or equal to 2 microliters, less than or equal to 1 microliter, less than or equal to 0.5 microliters, or less than or equal to 0.2 microliters. In certain embodiments, the volume of liquid associated with the particle collected from the outlet of the first fluidic channel is greater than or equal to 0.1 microliters, greater than or equal to 0.2 microliters, greater than or equal to 0.5 microliters, greater than or equal to 1 microliter, greater than or equal to 2 microliters, greater than or equal to 3 microliters, greater than or equal to 4 microliters, greater than or equal to 5 microliters, greater than or equal to 6 microliters, greater than or equal to 7 microliters, greater than or equal to 8 microliters, greater than or equal to 9 microliters, greater than or equal to 10 microliters, greater than or equal to 20 microliters, greater than or equal to 30 microliters, greater than or equal to 40 microliters, greater than or equal to 50 microliters, greater than or equal to 60 microliters, greater than or equal to 70 microliters, greater than or equal to 80 microliters, or greater than or equal to 90 microliters. Combinations of the above-referenced ranges are also possible (e.g., greater than or equal to 0.1 microliter and less than or equal to 100 microliters, greater than or equal to 0.1 microliter and less than or equal to 10 microliters). Other ranges are also possible.

In some embodiments, each single particle and associated liquid (e.g., having a volume of less than or equal to 100 microliters) may be collected without discarding any intermediary fluid. For example, a first particle and associated liquid may be collected from the outlet and a second particle and associated liquid may be collected from the outlet, without discarding any fluid between steps (e.g., collecting). Advantageously, the methods and devices described herein may have a relatively high uniformity of volume(s) collected with each particle. In some embodiments, the volume of liquid collected with each of two or more particles is substantially the same. In some embodiments, the difference in volume of a fluid associated with a first particle and a second particle does not vary by greater than or equal to 10% (e.g., greater than or equal to 5%, greater than or equal to 2%, greater than or equal to 1%) of the volume of each collected fluid. Advantageously, particles may be collected in relatively low and/or uniform volumes in, for example, two or more separate vessels.

In some embodiments, a single particle and associated liquid (e.g., having a volume of less than or equal to 10 microliters) may be introduced to each fluidically isolated surface without discarding any fluid. For example, a first particle and associated liquid may be introduction to a first fluidically isolated surface and a second particle and associated liquid may be introduced to a second fluidically isolated surface, without discarding any fluid between steps (e.g., introduction). Advantageously, the methods and devices described herein may have a relatively high uniformity of volume across fluidically isolated surfaces. In some embodiments, the volume of liquid in two or more fluidically isolated surfaces (comprising a single particle associated with each fluidically isolated surfaces) is substantially the same. In some embodiments, the difference in volume of a fluid associated with two or more fluidically isolated surfaces of the article does not vary by greater than or equal to 10% (e.g., greater than or equal to 5%, greater than or equal to 2%, greater than or equal to 1%) of the volume of each fluidically isolated surface.

In some embodiments, at least one pressure source is associated with and/or in fluidic communication with the fluidic channel. Each pressure source may comprise any suitable means for providing pressure to a fluid disposed within the fluidic channel. For example, in some embodiments, each pressure source may be a pump such as a syringe pump, a suction pump, a vacuum pump, or any other suitable pressure source. In some embodiments, each pressure source may not be in direct fluidic communication with the first fluidic channel. That is to say, in certain embodiments, one or more intervening fluidic channel(s) or fluidic region(s) (e.g., fluidic reservoirs) of the device may be present between the pressure source and the first fluidic channel.

In some embodiments, the individual particles flow in the fluidic channel at a particular average velocity along the longitudinal axis of the fluidic channel. In certain embodiments, the average velocity of the particles along the longitudinal axis of the fluidic channel is greater than or equal to 0.05 mm/second, greater than or equal to 0.1 mm/second, greater than or equal to 0.25 mm/second, greater than or equal to 0.5 mm/second, greater than or equal to 0.75 mm/second, greater than or equal to 1 mm/second, greater than or equal to 2 mm/second, greater than or equal to 3 mm/second, greater than or equal to 4 mm/second, greater than or equal to 5 mm/second, greater than or equal to 6 mm/second, greater than or equal to 7 mm/second, greater than or equal to 8 mm/second, greater than or equal to 9 mm/second, greater than or equal to 10 mm/second, greater than or equal to 20 mm/second, greater than or equal to 30 mm/second, greater than or equal to 40 mm/second, greater than or equal to 50 mm/second, greater than or equal to 60 mm/second, greater than or equal to 70 mm/second, greater than or equal to 80 mm/second, or greater than or equal to 90 mm/second. In some embodiments, the average velocity of the particles along the longitudinal axis of the fluidic channel is less than or equal to 100 mm/second, less than or equal to 90 mm/second, less than or equal to 80 mm/second, less than or equal to 70 mm/second, less than or equal to 60 mm/second, less than or equal to 50 mm/second, less than or equal to 40 mm/second, less than or equal to 30 mm/second, less than or equal to 20 mm/second, less than or equal to 10 mm/second, less than or equal to 9 mm/second, less than or equal to 8 mm/second, less than or equal to 7 mm/second, less than or equal to 6 mm/second, less than or equal to 5 mm/second, less than or equal to 4 mm/second, less than or equal to 3 mm/second, less than or equal to 2 mm/second, less than or equal to 1 mm/second, less than or equal to 0.75 mm/second, less than or equal to 0.5 mm/second, or less than or equal to 0.25 mm/second. Combinations of the above-referenced ranges are also possible (e.g., greater than or equal to 0.05 mm/second and less than or equal to 100 mm/second). Other ranges are also possible.

In some embodiments, the individual particles flow in the second fluidic channel at a particular average velocity along the longitudinal axis of the second fluidic channel. In certain embodiments, the average velocity of the particles along the longitudinal axis of the second fluidic channel is greater than or equal to 0.05 mm/second, greater than or equal to 0.1 mm/second, greater than or equal to 0.25 mm/second, greater than or equal to 0.5 mm/second, greater than or equal to 0.75 mm/second, greater than or equal to 1 mm/second, greater than or equal to 2 mm/second, greater than or equal to 3 mm/second, greater than or equal to 4 mm/second, greater than or equal to 5 mm/second, greater than or equal to 6 mm/second, greater than or equal to 7 mm/second, greater than or equal to 8 mm/second, or greater than or equal to 9 mm/second. In some embodiments, the average velocity of the particles along the longitudinal axis of the second fluidic channel is less than or equal to 10 mm/second, less than or equal to 9 mm/second, less than or equal to 8 mm/second, less than or equal to 7 mm/second, less than or equal to 6 mm/second, less than or equal to 5 mm/second, less than or equal to 4 mm/second, less than or equal to 3 mm/second, less than or equal to 2 mm/second, less than or equal to 1 mm/second, less than or equal to 0.75 mm/second, less than or equal to 0.5 mm/second, or less than or equal to 0.25 mm/second. Combinations of the above-referenced ranges are also possible (e.g., greater than or equal to 0.05 mm/second and less than or equal to 10 mm/second). Other ranges are also possible.

In certain embodiments, the article, system, and/or device may be configured such that each particle (e.g., biological entity) enters the second fluidic channel from the first fluidic channel at a frequency of less than or equal to 1 particle per 10 seconds, less than or equal to 1 particle per 15 seconds, less than or equal to 1 particle per 20 seconds, less than or equal to 1 particle per 25 seconds, less than or equal to 1 particle per 30 seconds, less than or equal to 1 particle per 40 seconds, less than or equal to 1 particle per 50 seconds, less than or equal to 1 particle per 60 seconds, less than or equal to 1 particle per 70 seconds, less than or equal to 1 particle per 80 seconds, less than or equal to 1 particle per 90 seconds, less than or equal to 1 particle per 100 seconds, or less than or equal to 1 particle per 110 seconds. In some embodiments, each particle enters the second fluidic channel from the first fluidic channel at a frequency of greater than or equal to 1 particle per 120 seconds, greater than or equal to 1 particle per 110 seconds, greater than or equal to 1 particle per 100 seconds, greater than or equal to 1 particle per 90 seconds, greater than or equal to 1 particle per 80 seconds, greater than or equal to 1 particle per 70 seconds, greater than or equal to 1 particle per 60 seconds, greater than or equal to 1 particle per 50 seconds, greater than or equal to 1 particle per 40 seconds, greater than or equal to 1 particle per 30 seconds, greater than or equal to 1 particle per 25 seconds, greater than or equal to 1 particle per 20 seconds, greater than or equal to 1 particle per 15 seconds, or greater than or equal to 1 particle per 10 seconds. Combinations of the above-referenced ranges are also possible (e.g., less than or equal to 1 particle per 10 seconds and greater than or equal to 1 particle per 120 seconds). Other ranges are also possible.

In certain embodiments, the device may be configured such that each particle (e.g., biological entity) exits the fluidic channel into a collection channel at a frequency of less than or equal to 1 particle per 10 seconds, less than or equal to 1 particle per 15 seconds, less than or equal to 1 particle per 20 seconds, less than or equal to 1 particle per 25 seconds, less than or equal to 1 particle per 30 seconds, less than or equal to 1 particle per 40 seconds, less than or equal to 1 particle per 50 seconds, less than or equal to 1 particle per 60 seconds, less than or equal to 1 particle per 70 seconds, less than or equal to 1 particle per 80 seconds, less than or equal to 1 particle per 90 seconds, less than or equal to 1 particle per 100 seconds, or less than or equal to 1 particle per 110 seconds. In some embodiments, each particle exits a fluidic channel into a collection fluidic channel at a frequency of greater than or equal to 1 particle per 120 seconds, greater than or equal to 1 particle per 110 seconds, greater than or equal to 1 particle per 100 seconds, greater than or equal to 1 particle per 90 seconds, greater than or equal to 1 particle per 80 seconds, greater than or equal to 1 particle per 70 seconds, greater than or equal to 1 particle per 60 seconds, greater than or equal to 1 particle per 50 seconds, greater than or equal to 1 particle per 40 seconds, greater than or equal to 1 particle per 30 seconds, greater than or equal to 1 particle per 25 seconds, greater than or equal to 1 particle per 20 seconds, greater than or equal to 1 particle per 15 seconds, or greater than or equal to 1 particle per 10 seconds. Combinations of the above-referenced ranges are also possible (e.g., less than or equal to 1 particle per 10 seconds and greater than or equal to 1 particle per 120 seconds).

In certain embodiments, the system may be configured such that each particle (e.g., biological entity) is introduced to each fluidically isolated surface at a particular frequency (e.g., the time between each particle being introduced to each fluidically isolated surface via a single outlet may be greater than or equal to 1 particle per 10 seconds). In some embodiments, each particle is introduced to each fluidically isolated surface at a frequency of less than or equal to 1 particle per 10 seconds, less than or equal to 1 particle per 15 seconds, less than or equal to 1 particle per 20 seconds, less than or equal to 1 particle per 25 seconds, less than or equal to 1 particle per 30 seconds, less than or equal to 1 particle per 40 seconds, less than or equal to 1 particle per 50 seconds, less than or equal to 1 particle per 60 seconds, less than or equal to 1 particle per 70 seconds, less than or equal to 1 particle per 80 seconds, less than or equal to 1 particle per 90 seconds, less than or equal to 1 particle per 100 seconds, or less than or equal to 1 particle per 110 seconds. In some embodiments, each particle is introduced to each fluidically isolated surface at a frequency of greater than or equal to 1 particle per 120 seconds, greater than or equal to 1 particle per 110 seconds, greater than or equal to 1 particle per 100 seconds, greater than or equal to 1 particle per 90 seconds, greater than or equal to 1 particle per 80 seconds, greater than or equal to 1 particle per 70 seconds, greater than or equal to 1 particle per 60 seconds, greater than or equal to 1 particle per 50 seconds, greater than or equal to 1 particle per 40 seconds, greater than or equal to 1 particle per 30 seconds, greater than or equal to 1 particle per 25 seconds, greater than or equal to 1 particle per 20 seconds, greater than or equal to 1 particle per 15 seconds, or greater than or equal to 1 particle per 10 seconds. Combinations of the above-referenced ranges are also possible (e.g., less than or equal to 1 particle per 10 seconds and greater than or equal to 1 particle per 120 seconds). Other ranges are also possible.

In some embodiments, each single particle and associated liquid (e.g., having a volume of less than or equal to 100 microliters) may be collected without discarding any intermediary fluid. For example, a first particle and associated liquid may be collected from the outlet and a second particle and associated liquid may be collected from the outlet, without discarding any fluid between steps (e.g., collecting).

Advantageously, the methods and devices described herein may have a relatively high uniformity of volume(s) collected with each particle. In some embodiments, the volume of liquid collected with each of two or more particles is substantially the same. In some embodiments, the difference in volume of a fluid associated with a first particle and a second particle does not vary by greater than or equal to 10% (e.g., greater than or equal to 5%, greater than or equal to 2%, greater than or equal to 1%) of the volume of each collected fluid. Advantageously, particles may be collected in relatively low and/or uniform volumes in, for example, two or more separate vessels.

Figure 4:
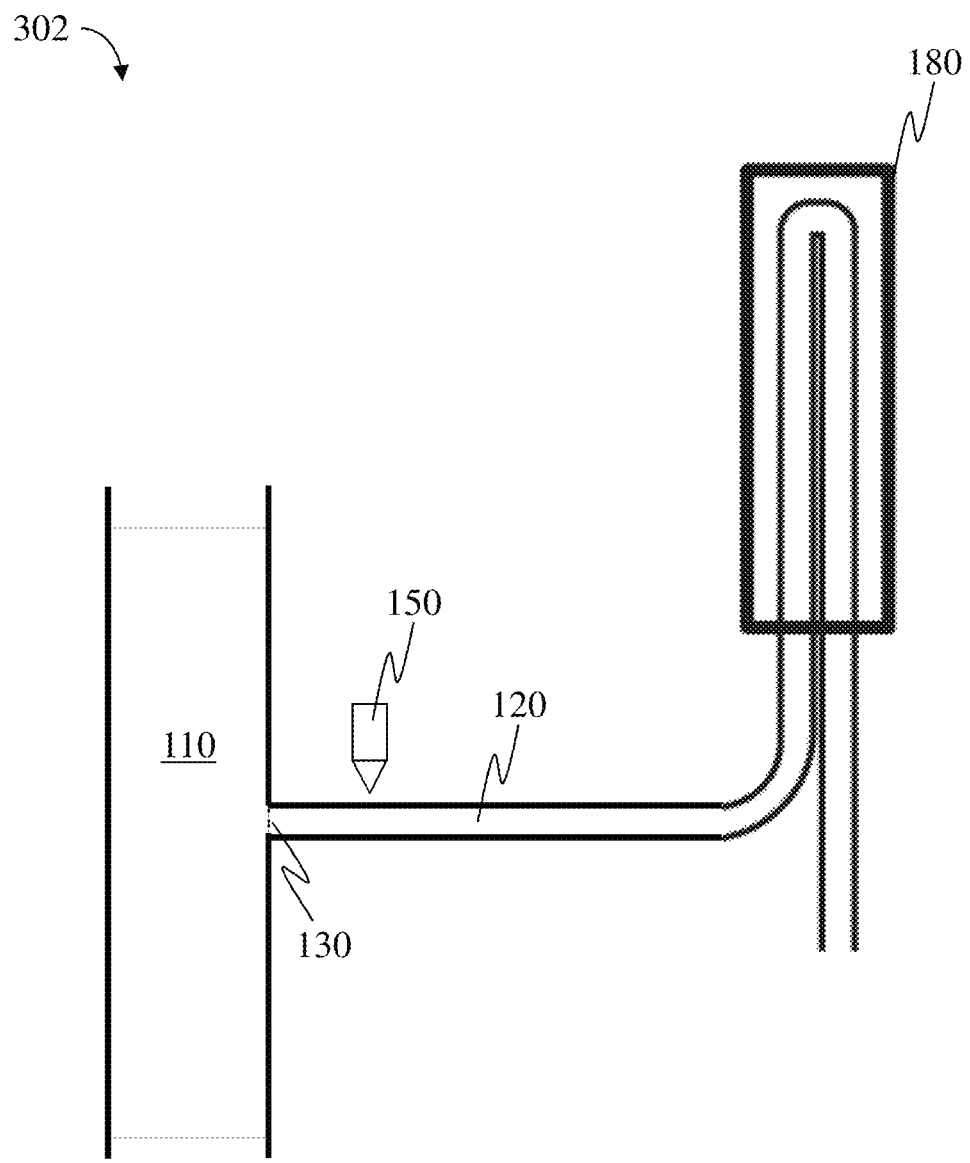
FIG. 4 is a schematic illustration of a system for determining a property of a particle, according to one set of embodiments.

In some embodiments, particles (e.g., biological entities) may be spaced within the second fluidic channel such that one or more properties of the particle (e.g., growth) may be monitored over relatively long periods of time (e.g., greater than or equal to 10 minutes per particle) within the second fluidic channel. For example, in some embodiments, the systems and methods described herein may be useful for providing cells to a suspended microchannel resonator (or an array of suspended microchannel resonators). For example, as illustrated in FIG. 4, system 302 comprises first fluidic channel 110, second fluidic channel 120 intersecting first fluidic channel 110 at intersection 130, detector 150, and a suspended microchannel resonator 180 in fluidic communication with second fluidic channel 120.

Figure 2C:
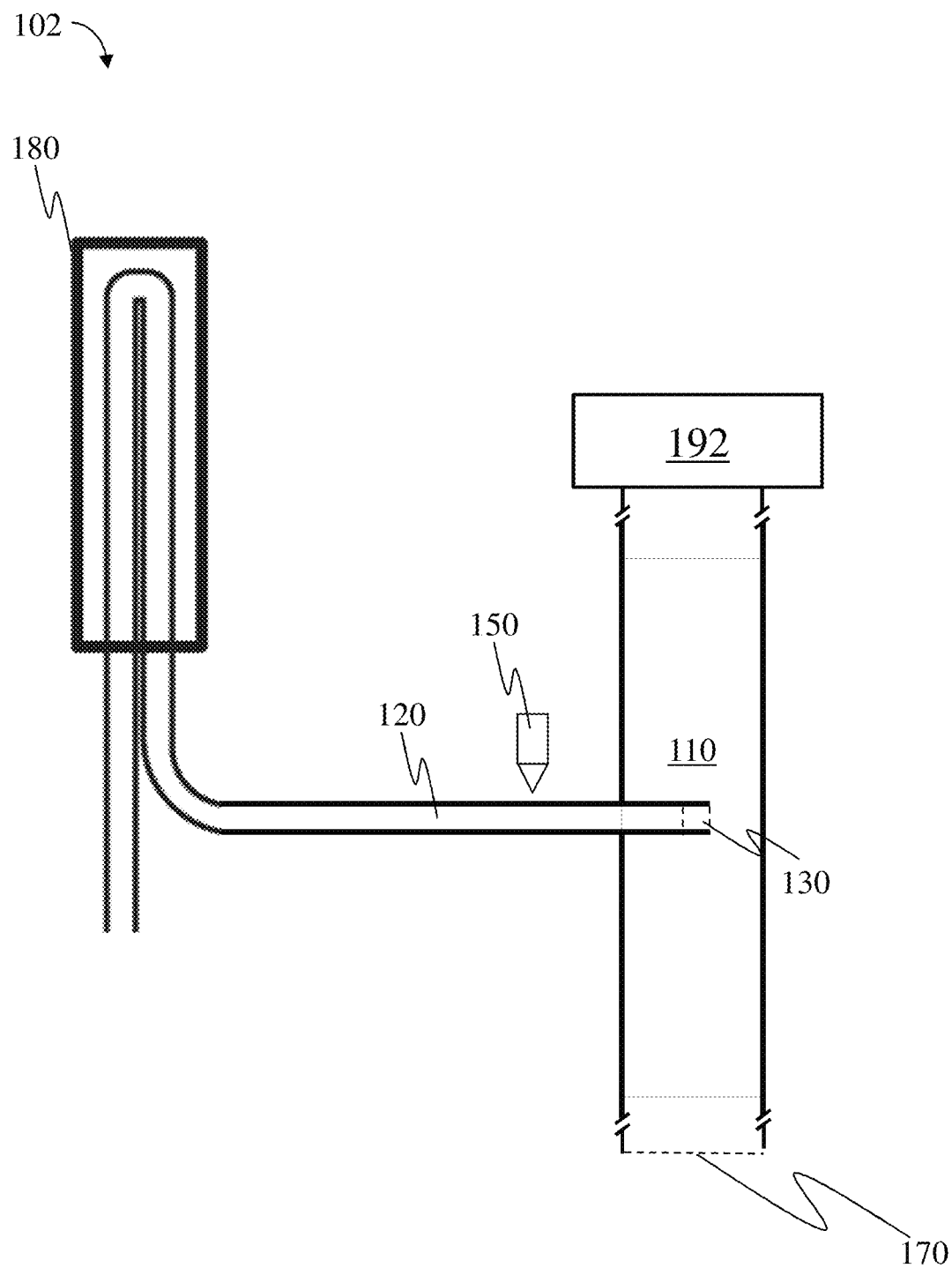
FIG. 2C is a cross-sectional schematic illustration of a device for directing the flow of a particle, according to one set of embodiments.

In some embodiments, the articles and methods described herein may be useful for collecting cells for which one or more properties had been measured in a suspended microchannel resonator (or an array of suspended microchannel resonators). For example, as illustrated in FIG. 2C, device 102 comprises first fluidic channel 110, second fluidic channel 120 orthogonal to first fluidic channel 110, exit 130 of second fluidic 120 disposed within first fluidic channel 110, optional detector 150, and a suspended microchannel resonator 180 in fluidic communication with second fluidic channel 120.

In embodiments in which the system comprises one or more suspended microchannel resonators, the suspended microchannel resonator may have one or more characteristics described in commonly-owned U.S. Pat. No. 7,387,889, entitled "Measurement of concentrations and binding energetics", issued Jun. 17, 2008; commonly-owned U.S. Pat. No. 7,838,284, entitled "Measurement of concentrations and binding energetics", issued Nov. 23, 2010; commonly-owned U.S. Pat. No. 9,134,294, entitled "Method And Apparatus For High Throughput Diagnosis Of Diseased Cells With Microchannel Devices", issued Sep. 15, 2015; commonly-owned U.S. Pat. No. 9,134,295, entitled "Serial Arrays of Suspended Microchannel Resonators", issued Sep. 15, 2015; commonly-owned U.S. Pat. No. 8,087,284, entitled "Method And Apparatus For Measuring Particle Characteristics Through Mass Detection", issued Jan. 3, 2012; commonly-owned U.S. Pat. No. 8,722,419, entitled "Flow cytometry Methods And Immunodiagnostics With Mass Sensitive Readout", issued May 13, 2014; each of which is incorporated herein by reference in its entirety for all purposes.

Fluids can be introduced (e.g., transport, flowed, displaced) into the system (or a fluidic channel therein (e.g., the first fluidic channel)) using any suitable component, for example, a pump, syringe, pressurized vessel, or any other source of pressure. Alternatively, fluids can be pulled into the fluidic channel by application of vacuum or reduced pressure on a downstream side of the channel or device. Vacuum may be provided by any source capable of providing a lower pressure condition than exists upstream of the channel or device. Such sources may include vacuum pumps, venturis, syringes and evacuated containers. It should be understood, however, that in certain embodiments, methods described herein can be performed with a changing pressure drop across a fluidic channel by using capillary flow, the use of valves, or other external controls that vary pressure and/or flow rate.

In some embodiments, introducing the fluid (e.g., comprising the plurality of particles) or at least a portion of the fluid comprises applying a pressure to the first fluidic channel such that at least a portion of a fluid enters the first fluidic channel. In certain embodiments, flowing the fluid comprises applying a pressure to the first fluidic channel such that at least a portion of a first fluid is transferred from (or to) the second fluidic channel intersecting the first fluidic channel. In certain embodiments, introducing the fluid comprising the plurality of particles to the second fluidic channel comprises applying a pressure to the second fluidic channel (or one or more channel(s) in fluidic communication with the second fluidic channel) such that at least a portion of the plurality of particles enter the second fluidic channel. In some cases, the plurality of particles may be flowed such that one or more particles exit the second fluidic channel at the exit of the second fluidic channel, and into the first fluidic channel, by applying a pressure to a fluid in the first fluidic channel and/or a fluid in the second fluidic channel. In some embodiments, the pressure is a positive pressure. In certain embodiments, the pressure is a negative or reduced pressure.

In certain embodiments, flowing the fluid comprises applying a pressure to the first fluidic channel such that at least a portion of a fluid is transferred from (or to) the second fluidic channel orthogonal to (and at least partially disposed within) the first fluidic channel. In some embodiments, the pressure is a positive pressure. In certain embodiments, the pressure is a negative or reduced pressure.

One or more fluidic channels of the system may have any suitable cross-sectional shape (e.g., circular, oval, triangular, irregular, trapezoidal, square or rectangular, or the like). A fluidic channel may also have an aspect ratio (length to average cross sectional dimension) of at least 2:1, more typically at least 3:1, 5:1, or 10:1 or more. A fluid within the fluidic channel may partially or completely fill the fluidic channel.

In some embodiments, the one or more fluidic channels may have a particular configuration. In certain embodiments, at least a portion of one or more fluidic channels may be substantially linear in the direction of fluid flow. In some embodiments, substantially all of one or more fluidic channels is substantially linear in the direction of fluid flow. In some embodiments, at least a portion of one or more fluidic channels may be curved, bent, serpentine, staggered, zigzag, spiral, or combinations thereof. Advantageously, the use of a non-linear fluidic channels may permit the incorporation of one or more suspended microchannel resonators into the system (e.g., in fluidic communication with at least the second fluidic channel).

The article(s), system(s), and device(s) or portions thereof (e.g., a fluidic channel, a suspended microchannel resonator) described herein can be fabricated of any suitable material. Non-limiting examples of materials include polymers (e.g., polypropylene, polyethylene, polystyrene, poly(acrylonitrile, butadiene, styrene), poly(styrene-co-acrylate), poly(methyl methacrylate), polycarbonate, polyester, poly(dimethylsiloxane), PVC, PTFE, PET, or blends of two or more such polymers), adhesives, and/or metals including nickel, copper, stainless steel, bulk metallic glass, or other metals or alloys, or ceramics including glass, quartz, silica, alumina, zirconia, tungsten carbide, silicon carbide, or non-metallic materials such as graphite, silicon, or others.

In some embodiments, the fluid or system is maintained under physiological conditions (e.g., for measuring cell growth). For example, in some embodiments, the fluid and/or the system is maintained at 37° C. and, optionally, pressurized with a 5% carbon dioxide gas mixture (e.g., to maintain pH stability of the growth media).

EXAMPLES

The following examples are intended to illustrate certain embodiments described herein, including certain aspects of the present invention, but do not exemplify the full scope of the invention.

Example 1—Fluidic Operation of the Serial SMR Platform

Figure 8A:
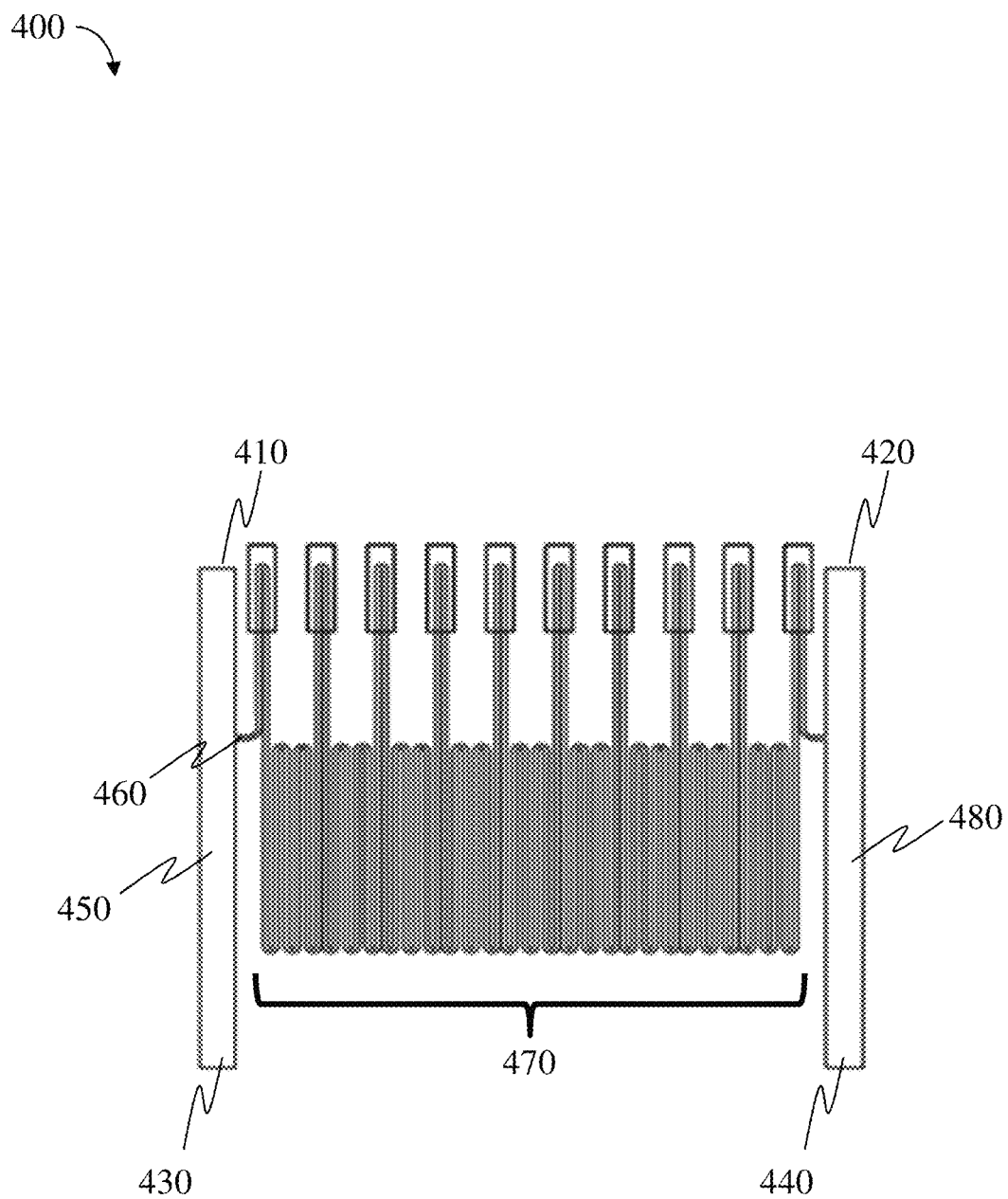
FIG. 8A is a schematic illustration of an exemplary system for determining a property of a particle, according to one set of embodiments.

The following example demonstrates the use of the system and methods described herein with an array of suspended microchannel resonators (SMRs) for growth rate and mass measurements of the cells. As illustrated in FIG. 8A, an array of SMRs 470 is in fluidic communication with a first fluidic channel 450 and a second fluidic channel 460, intersecting first fluidic channel 450. A first pressure source 410 and a second pressure source 430 are located upstream of second channel 460, and each in fluidic communication with first fluidic channel 450.

Figure 8B:
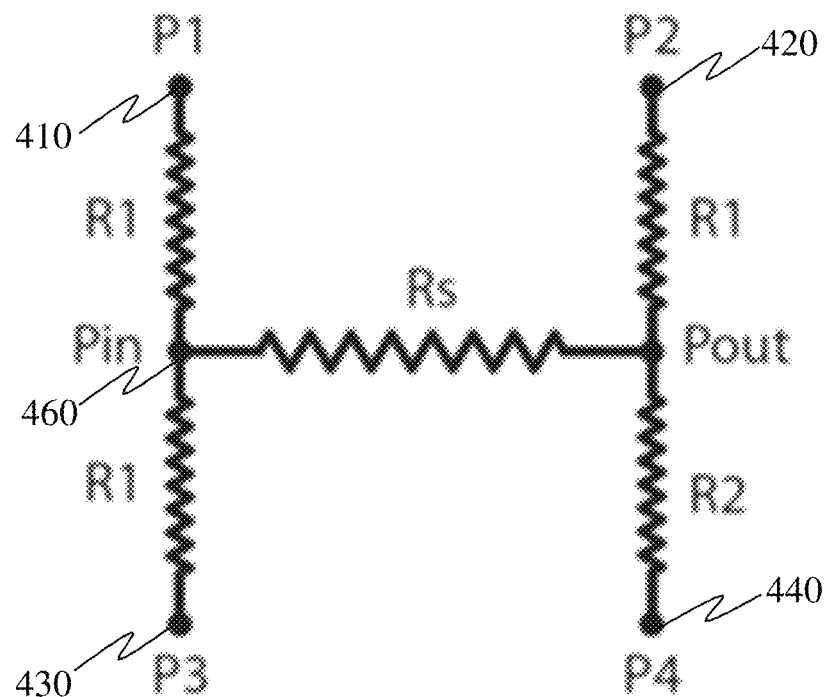
FIG. 8B is a schematic illustration of the relative flow resistance in fluidic channels of the system, according to one set of embodiments.

The system has independent control of both upstream and downstream pressures applied to the first fluidic channel. This control enables, for example, the establishment of different volumetric flow rates along the first fluidic channel as compared to flow rate across the second fluidic channel and mass sensor array (i.e. SMRs). In order to measure single-cell growth rates, a constant flow rate was maintained across the array of mass sensors—i.e. $P_{out}$ is maintained at a constant value for the entirety of a growth measurement experiment (as illustrated in corresponding FIG. 8B). FIG. 8B shows a resistor diagram for the fluidic channels of the system. Based on the symmetry of the fluidic channel designs and the channels used to run fluid through the device all resistances (R1) in the first fluidic channel are equivalent (with the exception of the channel used to collect cells from the device (R2)). Seeing as this collection channel had a smaller inner diameter, it generally lead to a higher fluidic resistance (R2>R1). FIG. 8B also includes the pressure values which determined the fluidic operation of the system including the upstream pressures (P1 and P2), downstream pressures (P3 and P4) and the pressures at the entrance and exit of the SMR mass sensor array ($P_{in}$ and $P_{out}$).

For the majority of the experiment, the upstream and downstream pressures applied to the bypass fluidic channel on the cell-loading side of the array were held constant in order to load cells in to the mass sensor array (P1=P3). However, this fluidic balance lead to a very low volumetric flow rate—on the order of 1 µl per hour—in the first fluidic channel. As such, for flushing the dead volume of the first fluidic channel and loading a sample of cells in to the platform for measurement, a significantly higher flow rate was generated along the cell-loading first fluidic channel (P1>>P3). During this flushing period, Pin was maintained at a constant value by increasing P1 and decreasing P3 by the same value. In some cases, this ensured consistent flow speed across the mass sensor regardless of whether the cell-loading first fluidic channel is in a state of cell (active) loading regimes or cell flushing regime as depicted in FIGS.

8A-8D. Depending on the type of cell sample being measured, this flushing regime may also be implemented periodically in order to deliver a fresh plug of cells for measurement or clear any debris that may aggregate in the first fluidic channel.

Figure 8C:
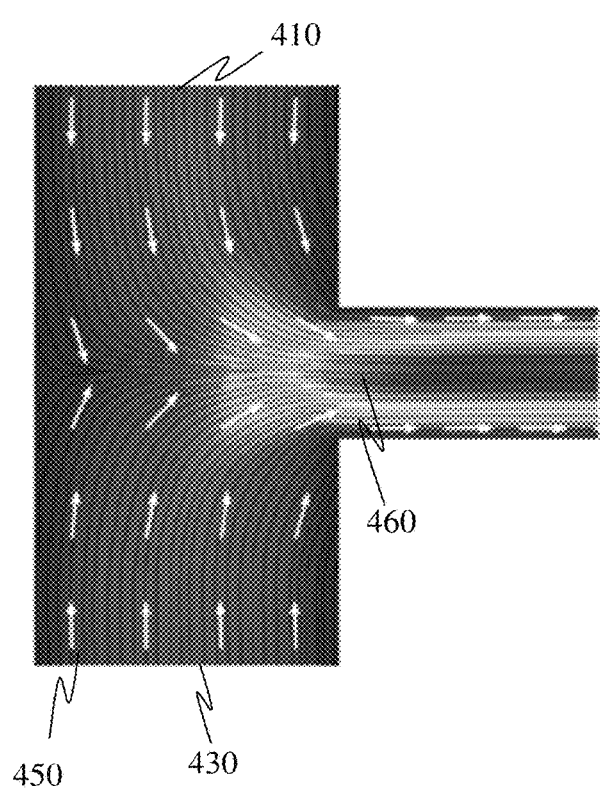
FIG. 8C is a fluid flow simulation of a system under a particle 'loading' regime (such as that illustrated in FIG. 8A), according to one set of embodiments.
Figure 8D:
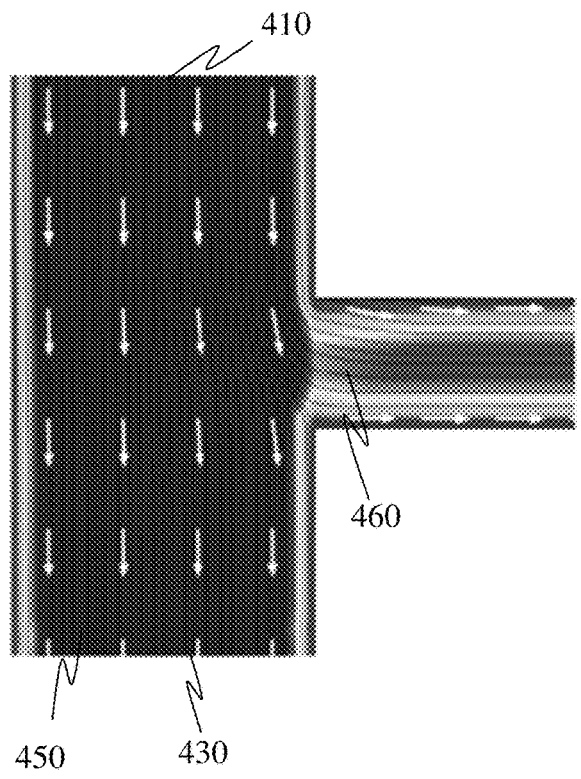
FIG. 8D is a fluid flow simulation of a system under a particle 'flushing' regime (such as that illustrated in FIG. 8B), according to one set of embodiments.

FIG. 8C shows a COMSOL fluidic model of the active loading regime for a first fluidic channel and the second fluidic channel intersecting the first fluidic channel. A first pressure may be applied upstream of the first fluidic channel 450 at 410 (e.g., via a first pressure source) and a second pressure may be applied downstream of the first fluidic channel 450 at 430 (e.g., via a second pressure source) such that the fluid enters second fluidic channel 460. FIG. 8D shows the flushing regime of the same system. The flow rates in the active loading regime and the flushing regimes within the second channel are substantially the same.

In some cases, it may be useful to ensure adequate spacing between cells (e.g., to control the collection of cells downstream). One approach to controlling the frequency of cell loading is to adjust the concentration of cells that are loaded in to the array of mass sensors. Based on Poisson statistics, the volumetric flow rate and cell concentration per unit volume can be used to determine the average expected time between cells entering the array (see 'Passive Loading' in FIG. 9). Although this approach may be effective for limiting the number of co-collection events, it imposes inherent throughput limits on the platform. For instance, if the minimum time between cells required for collection is 20 seconds, in order to reduce the co-collection frequency to less than ten percent, the cell concentration would have to be adjusted to yield an average time between cells of roughly 60 seconds. This time may be increased further when attempting to achieve a higher success rate for single-cell capture. As such, although the maximum throughput of the system as determined by the time required to flush cells is on the order of 180 cells per hour, a dilution approach alone limits the throughput to just 60 cells per hour.

In order to address the limitations of concentration-based cell loading, an active loading regime was implemented for the serial SMR devices. This fluidic process uses active switching between the flushing and loading configurations presented in FIGS. 8A-8D. With real-time access to the data generated by a detector (e.g., the first mass sensor in the array), it is possible to determine when a cell has entered the array based on the corresponding shift in resonant frequency of that sensor. This frequency shift may be used to trigger a switch from the cell (active) loading regime to the cell flushing regime. Although the volumetric sampling from the cell solution is equivalent between these two modes—based on the consistent flow maintained across the array of mass sensors—the volumetric flow fraction directed along the first fluidic channel while flushing is significantly greater than the flow directed to the array. Therefore, during the flushing regime, the majority of the streamlines continue along the first fluidic channel (FIG. 8D). Because cells are of finite size and occupy multiple streamlines, they are directed along the first fluidic channel and are not drawn in to the second fluidic channel. Therefore, as soon as the system is switched to a flushing regime, cells will not be loaded in to the array. Once a cell (active) loading event is triggered and flushing begins, a set amount of time is waited (e.g., 20 seconds) before switching back to a cell loading regime. In order to capture a cell quickly after switching back to loading, a significantly higher concentration cell sample may be used than is typical of experiments relying on Poisson based loading. Using this approach, a continuous stream of cells entering the array with a fixed separation in time, may be enabled.

Figure 9:
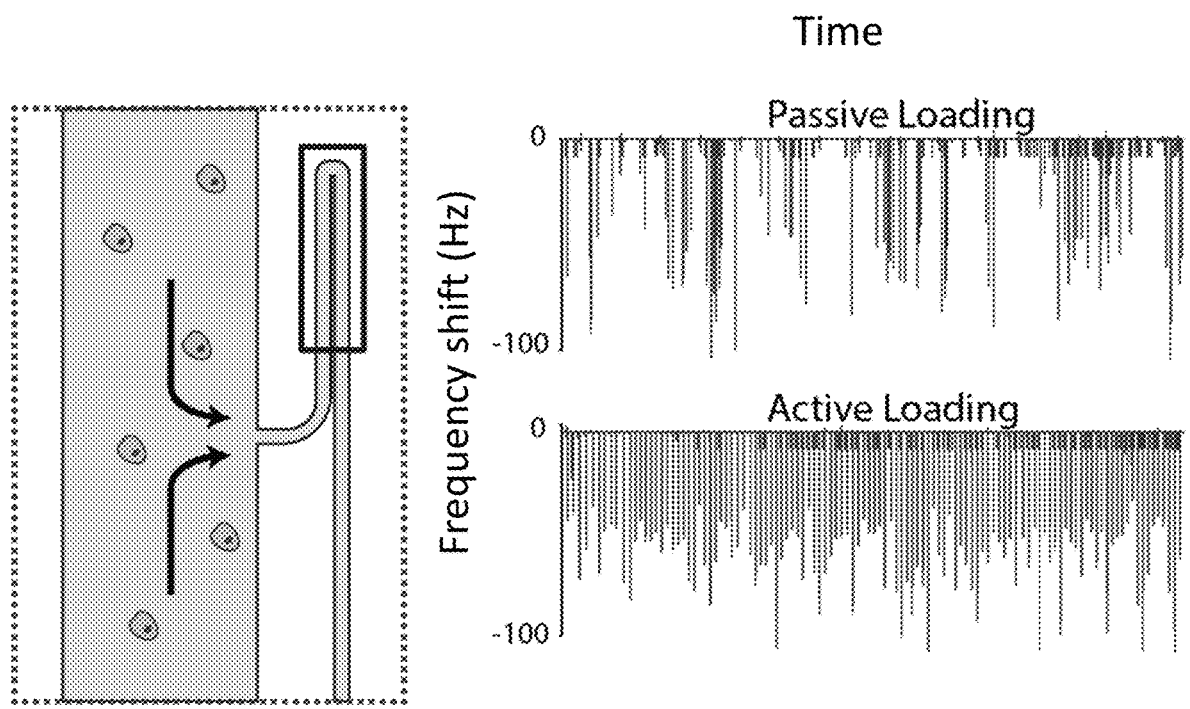
FIG. 9 are plots of resonance frequency of an SMR versus time for passive loading and active loading of particles, according to one set of embodiments.

FIG. 9 shows plots of resonance frequency versus time for a mass sensor (e.g., a suspended microchannel resonator) for cells loaded into the intersecting fluidic channel using alternating active loading regimes and flushing regimes ("active loading", top) and passive loading (bottom). A shift in resonant frequency is measured each time a single-cell traverses the first mass sensor, each vertical spike indicating a single-cell measurement. In the case of passive loading (top), single-cells enter the mass sensor array in a concentration-dependent manner following a Poisson distribution, leading to variability in the time spacing between sequential cell events. For active loading (bottom), the resonant frequency shift associated with a single-cell entering the array is used to trigger a switch from the active loading to flushing fluidic regimes (see FIGS. 8A-8D) until a desired time has elapsed and the system reverts back to a cell (active) loading regime. Such active switching allows for a substantially equally spaced stream of cells may enter the array of mass sensors, as seen in FIG. 9.

Example 2—Isolation of Glioblastoma Cells on Fluidically Isolated Surfaces

Figure 10A:
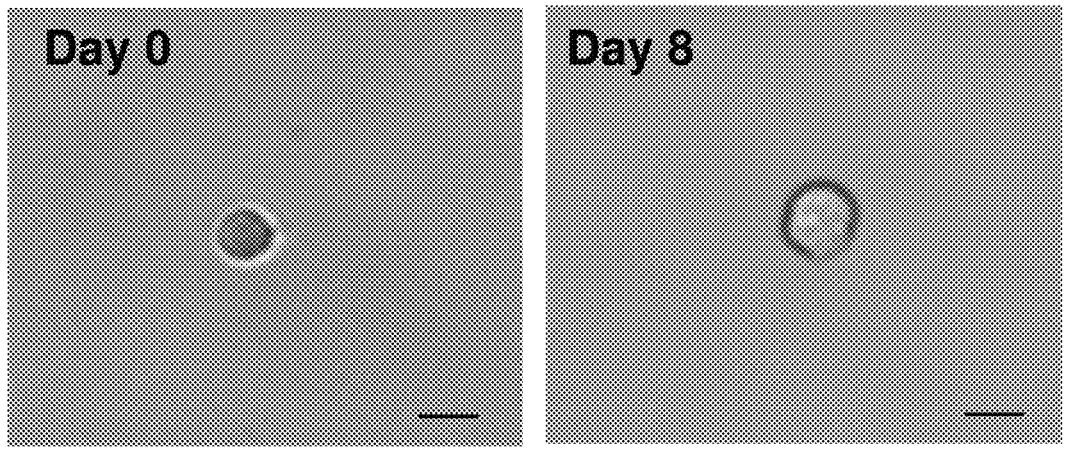
FIG. 10A is a micrograph of an exemplary biological entity isolated on a fluidically isolated surface and monitored for growth over 8 days on the isolated surface, according to one set of embodiments.
Figure 10B:
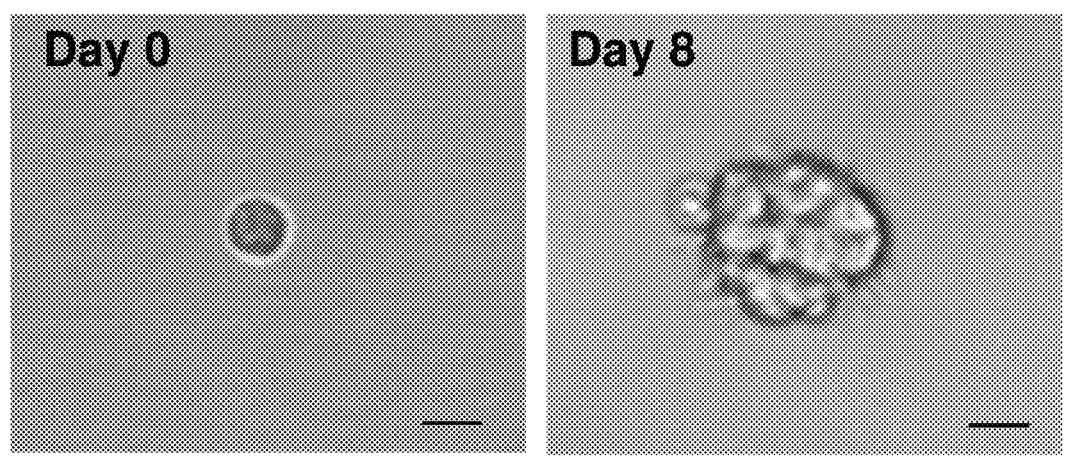
FIG. 10B is a micrograph of an exemplary biological entity isolated on a fluidically isolated surface and monitored for growth over 8 days on the isolated surface, according to one set of embodiments.

Glioblastoma BT145 cells at a concentration of 100,000 cells per mL were sorted into a 96-well plate, with a single glioblastoma cell in each well. Sphere forming assays were subsequently performed. FIGS. 10A-10B are representative cell images from a first well including a first fluidically isolated surface and a single cell associated with the surface (FIG. 10A) and a second well including a second fluidically isolated surface and a single cell associated with the surface (FIG. 10B). Images were taken immediately after cell release from the fluidic channel of the device onto the fluidically isolated surface, and after 8 days of cell culture. In this example, the single cell in FIG. 10A demonstrated no growth, whereas the single cell in FIG. 10B demonstrated cell outgrowth.

Prophetic Example 1—Flow Focusing (Directing) for Rapid Cell Release (Collection)

Figure 11:
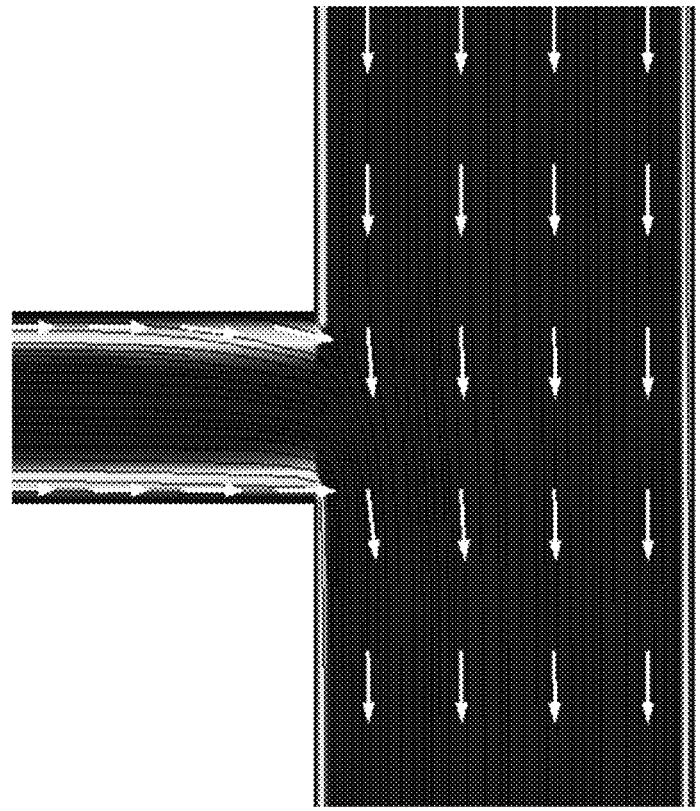
FIG. 11 is a fluid flow simulation of a comparative device comprising two intersecting channels, according to one set of embodiments.

As a single-cell exits the mass sensor array comprising a plurality of suspended microchannel resonators (e.g., via an exit of the second fluidic channel) it enters the cell-collection channel (i.e. the first fluidic channel). In a device in which the first and second fluidic channel intersect, the first fluidic channel has a significantly greater volumetric flow rate—a streamline distribution as seen in the fluidic model shown in FIG. 11 may occur. As such, the particle/cell would generally be driven very closely to the wall of the collection channel as it is being flushed from the device. Based on the flow profile within the collection channel, the particle/cell follows a fluidic path which causes it to move slower than the average velocity across the entire channel. Therefore, rather than flushing the system for only long enough to clear the dead volume of fluid—based on the volumetric flow rate—it instead may need to be flushed for significantly longer in order to ensure that the particle/cell is cleared from the system.

Figure 12:
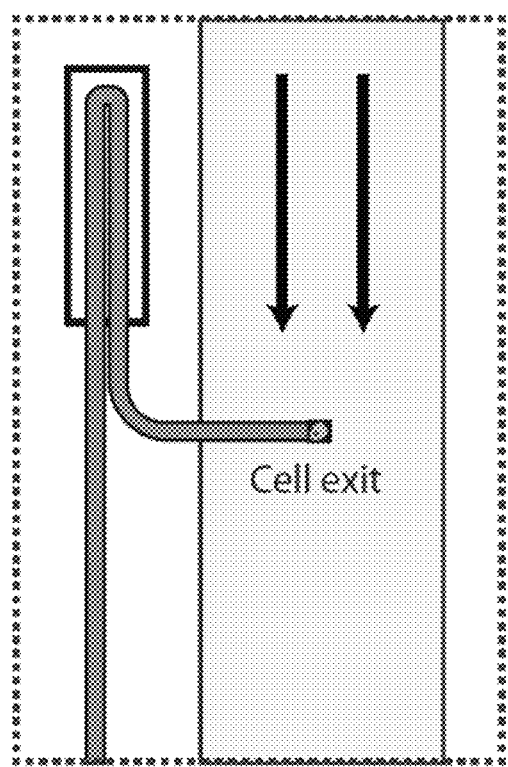
FIG. 12 is a schematic illustration of an exemplary device for directing the flow of a particle, according to one set of embodiments.
Figure 12:
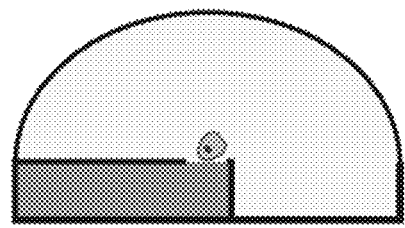

One way to achieve cell focusing at the center of the release channel is with a varied fabrication approach, as illustrated in FIG. 12. The collection channel (i.e. the first fluidic channel) may be etched in a separate layer—for instance in a top glass layer alone—such that the exit of the second fluidic channel can be positioned at or near the center of the particle/cell collection channel. This placement helps particles/cells exiting the mass sensor array to be centered in the cell-collection channel, thus placing the cells in the maximum flow profile of the collection channel and/or helping to enable relatively consistent cell collection rates. In some cases, this approach may reduce the minimum time required to flush a single particle/cell from the device and/or may increase the maximum achievable throughput of the collection measurements.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Any terms as used herein related to shape, orientation, alignment, and/or geometric relationship of or between, for example, one or more articles, structures, forces, fields, flows, directions/trajectories, and/or subcomponents thereof and/or combinations thereof and/or any other tangible or intangible elements not listed above amenable to characterization by such terms, unless otherwise defined or indicated, shall be understood to not require absolute conformance to a mathematical definition of such term, but, rather, shall be understood to indicate conformance to the mathematical definition of such term to the extent possible for the subject matter so characterized as would be understood by one skilled in the art most closely related to such subject matter. Examples of such terms related to shape, orientation, and/or geometric relationship include, but are not limited to terms descriptive of: shape—such as, round, square, circular/circle, rectangular/rectangle, triangular/triangle, cylindrical/cylinder, elliptical/ellipse, (n)polygonal/(n)polygon, etc.; angular orientation—such as perpendicular, orthogonal, parallel, vertical, horizontal, collinear, etc.; contour and/or trajectory—such as, plane/planar, coplanar, hemispherical, semi-hemispherical, line/linear, hyperbolic, parabolic, flat, curved, straight, arcuate, sinusoidal, tangent/tangential, etc.; direction—such as, north, south, east, west, etc.; surface and/or bulk material properties and/or spatial/temporal resolution and/or distribution—such as, smooth, reflective, transparent, clear, opaque, rigid, impermeable, uniform(ly), inert, non-wettable, insoluble, steady, invariant, constant, homogeneous, etc.; as well as many others that would be apparent to those skilled in the relevant arts. As one example, a fabricated article that would described herein as being "square" would not require such article to have faces or sides that are perfectly planar or linear and that intersect at angles of exactly 90 degrees (indeed, such an article can only exist as a mathematical abstraction), but rather, the shape of such article should be interpreted as approximating a "square," as defined mathematically, to an extent typically achievable and achieved for the recited fabrication technique as would be understood by those skilled in the art or as specifically described. As another example, two or more fabricated articles that would described herein as being "aligned" would not require such articles to have faces or sides that are perfectly aligned (indeed, such an article can only exist as a mathematical abstraction), but rather, the arrangement of such articles should be interpreted as approximating "aligned," as defined mathematically, to an extent typically achievable and achieved for the recited fabrication technique as would be understood by those skilled in the art or as specifically described.

What is claimed:

1. A method, comprising:
   flowing a fluid comprising a first group of a plurality of particles in a first fluidic channel, the first fluidic channel in fluidic communication with a second fluidic channel, wherein a difference in pressure between the first fluidic channel and the second fluidic channel results in a single particle from the first group entering the second fluidic channel;
   detecting, with a detector, the presence of the single particle in the second fluidic channel;
   changing a flow rate of the fluid in the first fluidic channel such that at least a portion of remaining particles of said first group of the plurality of particles flow through the first fluidic channel, and
   flowing the single particle through the second fluidic channel such that no additional particles from the first group of the plurality of particles enter into the second fluidic channel, wherein the single particle is maintained at a constant flow rate in the second fluidic channel while flowing additional particles through the first fluidic channel.

2. The method as in claim 1, wherein the plurality of particles are a plurality of biological entities.

3. The method as in claim 2, wherein the plurality of biological entities comprise virions, bacteria, protein complexes, exosomes, cells, or fungi.

4. The method as in claim 1, wherein the first fluidic channel has an average cross-sectional dimension of greater than or equal to 5 microns and less than or equal to 2 mm.

5. The method as in claim 1, wherein the second fluidic channel has an average cross-sectional dimension of greater than or equal to 50 microns and less than or equal to 2 mm.

6. The method as in claim 1, wherein the average cross-sectional dimension of the first fluidic channel to the average cross-sectional dimension of the second fluidic channel is at least 1 and less than or equal to 10.

7. The method as in claim 1, wherein a density of particles in the first fluidic channel is greater than or equal to 100 particles per milliliter and less than or equal to 1,000,000 particles per milliliter.

8. The method as in claim 1, wherein a fluidic pressure at the intersection during the step of changing the flow rate is within less than or equal to 10% and greater than or equal to 0.01% of the fluidic pressure at the intersection during the step of flowing the fluid comprising the first group of the plurality of particles in the first fluidic channel.

9. The method as in claim 1, wherein a flow rate of the fluid in the second fluidic channel during the step of changing the flow rate is within less than or equal to 10% and greater than or equal to 0.01% of the flow rate of the fluid in the second fluidic channel during the step of flowing the fluid comprising the first group of the plurality of particles in the first fluidic channel.

10. The method as in claim 1, comprising flowing the fluid comprising the first group of the plurality of particles and a second group of the plurality of particles in the first fluidic channel, wherein a difference in pressure between the first fluidic channel and the second fluidic channel results in at least a second particle from the second group entering the second fluidic channel, the particles within the second fluidic channel may be spaced at an average spacing of at least 20 microns and less than or equal to 500 mm apart along a longitudinal axis of the second fluidic channel.

11. The method as in claim 1, comprising flowing the fluid comprising the first group of the plurality of particles and a second group of the plurality of particles in the first fluidic channel, wherein a difference in pressure between the first fluidic channel and the second fluidic channel results in at least a second particle from the second group entering the second fluidic channel, wherein particles within the second fluidic channel may be separated such that at least 90% of the spacings between particles in the second fluidic channel differ by no more than less than 10% and greater than or equal to 0.1% of an average spacing between the particles.

12. The method as in claim 1, comprising flowing the fluid comprising the first group of the plurality of particles and a second group of the plurality of particles in the first fluidic channel, wherein a difference in pressure between the first fluidic channel and the second fluidic channel results in at least a second particle from the second group entering the second fluidic channel, wherein an average velocity of the particles within the second fluidic channel along the longitudinal axis of the second fluidic channel is greater than or equal to 0.1 mm/second and less than or equal to 10 mm/second.

13. The method as in claim 1, comprising flowing the fluid comprising the first group of the plurality of particles and a second group of the plurality of particles in the first fluidic channel, wherein a difference in pressure between the first fluidic channel and the second fluidic channel results in at least a second particle from the second group entering the second fluidic channel, wherein each particle enters the second fluidic channel from the first fluidic channel at a frequency of less than or equal to 1 particle per 10 seconds and greater than or equal to 1 particle per 120 seconds.

14. The method as in claim 1, wherein the second fluidic channel is in fluidic communication with at least one suspended microchannel resonator.

15. The method as in claim 1, comprising, flowing at least a portion of a fluid in which the single particle is suspended, out of the second fluidic channel and into the first fluidic channel, while maintaining the single particle in the second fluidic channel.

16. The method as in claim 1, wherein the detector is selected from the group consisting of optical detectors, mass sensors, capacitive sensors, thermal sensors, resistive pulse sensors, electrical current sensors, MEMS-based pressure sensors, acoustic sensors, ultrasonic sensors and suspended microchannel resonators.

17. A method, comprising:
   introducing a single particle into a second fluidic channel from a first fluidic channel containing a plurality of particles in a fluid, the second fluidic channel in fluidic communication with the first fluidic channel, wherein a difference in pressure between the first fluidic channel and the second fluidic channel results in the single particle entering the second fluidic channel;

detecting, with a detector, the presence of the single particle in the second fluidic channel; and responsive to detecting the single particle, retaining the single particle at a constant flow rate through the second fluidic channel while changing a flow rate of the remaining particles from the plurality of particles through the first fluidic channel such that no additional particles from the plurality of particles enter into the second fluidic channel.

18. A method, comprising:

introducing a plurality of particles in a fluid into a first fluidic channel;

flowing a first group of particles from the plurality of particles in the first fluidic channel, wherein a difference in pressure between the first fluidic channel and a second fluidic channel results in a first particle from the first group of particles entering the second fluidic channel while the remaining particles in the first group of particles do not enter the second fluidic channel;

changing a flow rate of the fluid in the first fluidic channel;

flowing a second group of particles from the plurality of particles in the first fluidic channel, wherein a difference in pressure between the first fluidic channel and the second fluidic channel results in a second particle from the second group of particles entering the second fluidic channel while the remaining particles in the second group of particles do not enter the second fluidic channel;

wherein the second fluidic channel intersects and is in fluidic communication with the first fluidic channel, wherein each particle enters the second fluidic channel from the first fluidic channel at a frequency within a range of from less than or equal to 1 particle per 10 seconds to greater than or equal to 1 particle per 120 seconds; and flowing, between the entry of each particle into the second fluidic channel from the first fluidic channel, a fluid in the first fluidic channel, wherein each particle in the second fluidic channel is maintained at a constant flow rate while flowing additional particles through the first fluidic channel.

* * * * *